US012764046B2

(12) United States Patent
Wang et al.

(10) Patent No.: US 12,764,046 B2
(45) Date of Patent: Oct. 13, 2026

(54) SUCCESSFUL CONNECTS METRICS FOR MONITORING AND CONTROL OF WIRELESS OR WIRED NETWORKS

(71) Applicant: Juniper Networks, Inc., Sunnyvale, CA (US)

(72) Inventors: Wenfeng Wang, Cupertino, CA (US); Randall Frei, San Jose, CA (US); Jacob Thomas, Saratoga, CA (US); Kush Shah, Santa Clara, CA (US); Jisheng Wang, Palo Alto, CA (US); Abhiram Madhugiri Shamsundar, San Jose, CA (US); Robert J. Friday, Los Gatos, CA (US); Wesley Purvis, Yardley, PA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 72 days.

(21) Appl. No.: 17/652,787

(22) Filed: Feb. 28, 2022

(65) Prior Publication Data

US 2023/0275820 A1 Aug. 31, 2023

(51) Int. Cl.
*G06F 15/173* (2006.01)
*H04L 43/02* (2022.01)
(Continued)

(52) U.S. Cl.
CPC .......... *H04L 43/0811* (2013.01); *H04L 43/02* (2013.01); *H04L 43/04* (2013.01); *H04L 43/50* (2013.01)

(58) Field of Classification Search
CPC ..... H04L 43/0811; H04L 43/02; H04L 43/04; H04L 43/50
(Continued)

(56) References Cited

U.S. PATENT DOCUMENTS 9,014,009 B2 * 4/2015 Li ........................ H04L 41/0677 370/242
9,729,439 B2 8/2017 MeLampy et al.
(Continued)

FOREIGN PATENT DOCUMENTS

EP 3554011 A1 10/2019
EP 3706370 A1 9/2020

OTHER PUBLICATIONS

U.S. Appl. No. 17/303,222, filed May 24, 2021, naming inventor Safavi.

(Continued)

*Primary Examiner* — Thuong Nguyen
(74) *Attorney, Agent, or Firm* — Shumaker & Sieffert P.A.

(57) ABSTRACT

A network management system (NMS) initiates, for each of a plurality of wireless and/or wired client devices, a wireless/wired stateful machine configured to continuously monitor at least one pre-connection state and at least one post-connection state of a corresponding wireless/wired connection session, and determines one or more network connection assessments for the plurality of wireless/wired client devices based on success or failure of the pre-connection states and/or the post-connection states. The NMS may also output a notification including identification of a root cause of any network connection failure(s) and/or automatically invoke remedial action intended to address or mitigate the root cause of the network connection failure(s).

21 Claims, 15 Drawing Sheets

(51) Int. Cl.
*H04L 43/04* (2022.01)
*H04L 43/0811* (2022.01)
*H04L 43/50* (2022.01)

(58) Field of Classification Search
USPC .......................................................... 709/224
See application file for complete search history.

(56) References Cited

U.S. PATENT DOCUMENTS 9,729,682 B2 8/2017 Kumar et al.
9,762,485 B2 9/2017 Kaplan et al.
9,832,082 B2 11/2017 Dade et al.
9,871,748 B2 1/2018 Gosselin et al.
9,894,604 B1 * 2/2018 Tran ...................... H04W 12/08
9,985,883 B2 5/2018 MeLampy et al.
10,200,264 B2 2/2019 Menon et al.
10,277,506 B2 4/2019 Timmons et al.
10,432,522 B2 10/2019 Kaplan et al.
10,756,983 B2 8/2020 Ratkovic et al.
10,862,742 B2 * 12/2020 Singh ...................... H04L 67/10
10,958,537 B2 3/2021 Safavi
10,958,585 B2 3/2021 Safavi
10,985,969 B2 4/2021 Safavi
10,992,543 B1 4/2021 Rachamadugu et al.
2001/0047420 A1 * 11/2001 Talanis ............... G05B 19/4183 709/229
2003/0093534 A1 * 5/2003 Hartmann ............ H04L 69/329 709/227
2006/0087474 A1 * 4/2006 Do ........................ G01S 1/7038 342/386
2006/0137009 A1 * 6/2006 Chesla .................. G06F 21/552 726/22
2006/0271702 A1 * 11/2006 Canali ................ H04Q 11/0478 709/238
2007/0297430 A1 * 12/2007 Nykanen ............. H04W 12/069 370/408
2008/0080428 A1 * 4/2008 Jappila ............ H04W 36/00226 370/331
2008/0144529 A1 * 6/2008 McKee ..................... H04L 9/40 370/254
2009/0307753 A1 * 12/2009 Dupont ................... H04L 63/08 726/11
2009/0313329 A1 * 12/2009 Agrawal ............. H04L 12/1827 709/204
2010/0174945 A1 * 7/2010 Watanabe ........... H04M 3/2254 714/E11.029
2012/0113815 A1 * 5/2012 Zhang ..................... H04L 41/12 370/242
2012/0170464 A1 * 7/2012 Sakurai ............... H04L 43/0817 370/242
2012/0178488 A1 * 7/2012 Jonker .................. H04W 8/005 455/517
2013/0122910 A1 * 5/2013 Singh .................. H04W 36/322 455/437
2013/0229338 A1 * 9/2013 Sohn ....................... G06F 3/011 345/156
2015/0163840 A1 * 6/2015 Ji .......................... H04W 76/14 455/552.1
2015/0189034 A1 * 7/2015 Kelkar .................... H04L 67/01 709/203
2016/0014669 A1 * 1/2016 Patil ...................... H04W 76/11 370/329
2016/0029292 A1 * 1/2016 Lynn, Jr. ............... H04W 72/51 370/329
2017/0142599 A1 * 5/2017 Babaei .................. H04W 24/10
2018/0139086 A1 * 5/2018 Chakraborty ....... H04L 43/0823
2019/0007290 A1 * 1/2019 He ...................... H04L 43/0823
2019/0052609 A1 * 2/2019 Skuratovich ........ H04L 65/1101
2019/0059117 A1 * 2/2019 Shu ....................... H04W 76/25
2019/0312815 A1 * 10/2019 Altman ................. H04L 43/026
2019/0317871 A1 * 10/2019 Chen ................... H04L 43/0817
2019/0356533 A1 11/2019 Vasseur et al.
2019/0356553 A1 11/2019 Mermoud et al.
2020/0022204 A1 * 1/2020 Husted .............. H04W 28/0268
2020/0037242 A1 * 1/2020 Yilmaz ............. H04W 52/0216
2020/0084087 A1 3/2020 Sharma et al.
2020/0227328 A1 * 7/2020 Anjum .................. G06F 30/367
2020/0394335 A1 * 12/2020 Cottrill ................... H04L 9/002
2020/0403890 A1 12/2020 McCulley et al.
2021/0219369 A1 * 7/2021 Zheng ................... H04W 48/12
2021/0306201 A1 9/2021 Wang et al.
2023/0126313 A1 * 4/2023 Shah ..................... H04W 24/04 370/252

OTHER PUBLICATIONS

Response to Extended Search Report dated Jul. 10, 2023, from counterpart European Application No. 22209996.2 filed Feb. 29, 2024, 30 pp.

Response to Communication pursuant to Article 94(3) EPC dated Feb. 28, 2025, from counterpart European Application No. 22209996.2 filed Jun. 25, 2025, 14 pp.

Extended Search Report from counterpart European Application No. 22209996.2 dated Jul. 10, 2023, 10 pp.

Communication pursuant to Article 94(3) EPC from counterpart European Application No. 22209996.2 dated Feb. 28, 2025, 7 pp.

* cited by examiner

SUCCESSFUL CONNECTS METRICS FOR MONITORING AND CONTROL OF WIRELESS OR WIRED NETWORKS

TECHNICAL FIELD

The disclosure relates generally to computer networks and, more specifically, to monitoring and control of wireless or wired networks.

BACKGROUND

Commercial premises, such as offices, hospitals, airports, stadiums, or retail outlets, often install complex wireless network systems, including a network of wireless access points (APs), throughout the premises to provide wireless network services to one or more wireless client devices. The APs may enable the wireless client devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee, and/or other wireless networking technologies. The wireless client devices (also referred to herein as "wireless devices") include mobile computing devices such as smartphones, tablet computers, laptop computers, and wearable devices (e.g., smart watches, smart rings, etc.), wireless printers, wireless Internet of Things (IoT) devices, and any other device configured to communicate over a wireless network. Wired client devices include any device connected directly to a wired network such as APs, printers, appliances, wired IoT devices, etc.

SUMMARY

In general, this disclosure describes one or more techniques for a network management system (NMS) to remotely monitor and/or evaluate performance of wireless or wired networks based on one or more network connection assessments. The network connection assessments may include, for example, one or more successful connects metrics. For a wireless network, for example, the NMS monitors pre-connection and post-connection states of one or more wireless connection sessions on a per-wireless client basis and determines one or more wireless successful connects metrics. The wireless successful connects metrics are indicative of the extent to which wireless clients are able to successfully connect and remain connected to the wireless network for the duration of a wireless connection session.

For a wired network, for example, the NMS monitors and evaluates one or more pre-connection and post-connection states of one or more wired connection sessions on a per-wired client basis to determine one or more wired successful connects metrics. The wired successful connects metrics are indicative of the extent to which wired clients are able to successfully connect and remain connected to the wired network for the duration of a wired connection session.

The wireless successful connects metric and the wired successful connects metrics may each include one or more classifiers. The wireless successful connects metric classifiers may include, for example, an association classifier, an authorization classifier, a Dynamic Host Configuration Protocol (DHCP) classifier, an Address Resolution Protocol (ARP) classifier, and a Domain Name System (DNS) classifier. In general, the association classifier and the authorization classifier reflect pre-connection states. The DHCP classifier includes one or more sub-classifiers that reflect pre-connection state(s) and one or more sub-classifiers that reflect post-connection state(s). The ARP and DNS classifiers reflect post-connection states.

The wired successful connects metric classifiers may include, for example, a DHCP classifier and an authentication classifier. The authentication classifier reflects a pre-connection state. The DHCP classifier includes one or more sub-classifiers that reflect pre-connection state(s) and one or more sub-classifiers that reflect post-connection state(s).

The scores for the wireless successful connects metrics/classifiers/sub-classifiers for a plurality of wireless client devices are aggregated over one or more selected periods of time to determine an overall score for the wireless successful connects metric/classifiers/sub-classifiers. For example, the score for the aggregated wireless successful connects metric may be expressed as, for example, a percentage or an absolute number of successful wireless connection sessions for a plurality of wireless client devices during a selected period of time. As another example, the score for the aggregated wireless successful connects metric classifiers/sub-classifiers may be expressed as, for example, a percentage or an absolute number of the wireless connection sessions for the plurality of wireless client devices that experienced a failure with respect to the associated state as compared to a total number of wireless connection sessions for the plurality of wireless client devices that experienced a failure during a selected period of time. In this way, the NMS attributes failures by wireless clients to successfully connect and remain connected to the wireless network for the duration of a wireless connection session to the wireless pre-connection and/or post-connection classifiers/sub-classifiers, thus providing guidance to IT personnel to help troubleshoot and address wireless connection issues, and/or enabling the NMS to automatically identify and invoke remedial action intended to address or mitigate the identified pre-connection or post-connection issues.

Similarly, the scores for the wired successful connects metrics/classifiers/sub-classifiers for a plurality of wired client devices are aggregated over one or more selected periods of time to determine an overall score for the wired successful connects metric/classifiers/sub-classifiers. For example, the score for the aggregated wired successful connects metric may be expressed as, for example, a percentage or an absolute number of successful wired connection sessions for a plurality of wired client devices during a selected period of time. As another example, the score for the aggregated wired successful connects metric classifiers/sub-classifiers may be expressed as, for example, a percentage or an absolute number of the wired connection sessions for the plurality of wired client devices that experienced a failure with respect to the associated state as compared to a total number of wired connection sessions for the plurality of wired client devices that experienced a failure during a selected period of time. In this way, the NMS attributes failures by wired clients to successfully connect and remain connected to the wired network for the duration of a wired connection session to the wired pre-connection and/or post-connection classifiers/sub-classifiers, thus providing guidance to IT personnel to help troubleshoot and address wired connection issues, and/or enabling the NMS to automatically identify and invoke remedial action intended to address or mitigate the pre-connection or post-connection issues.

Based on the wireless and/or wired successful connects metric(s), the NMS may identify one or more anomalies in network performance with respect to the ability of client devices to successfully connect to and remain connected to the wireless and/or wired network, respectively, for the duration of a wireless/wired connection session. The NMS may further identify a root cause of the identified anomalies, and/or automatically invoke one or more remedial actions to address or mitigate the root cause of the identified anomalies.

The techniques of the disclosure provide one or more technical advantages and practical applications. The techniques enable the NMS to automatically monitor and quantify pre-connection and/or post-connection states for the duration of a wireless and/or wired connection session for a plurality of wired and/or wireless clients on a per-client basis. In this way, the NMS is able to provide monitoring and issue identification for the full connection session (pre-connection and post-connection) for both wireless clients and wired clients. Because the NMS monitors and identifies anomalies for the full connection session, the NMS may further identify root causes of both pre-connection and/or post-connection anomalies, and/or automatically invoke one or more remedial actions to address the root cause of both pre-connection and/or post-connection anomalies. Automatically invoking remedial action to address the pre-connection and/or post-connection state failure(s) (or at least identifying the root cause of the failure(s)) may help to prevent the same issues from being experienced by other client devices attempting to connect to the wireless and/or wired network in question. In this way, the techniques of the disclosure may enhance the ability of wireless and/or wired clients to successfully connect to the respective wireless and/or wired network and remain connected for the duration of a wireless and/or wired connection session, thus enhancing the user experience provided to the wireless and/or wired client devices by the respective wireless and/or wired network.

In one example, the disclosure describes a network management system (NMS) comprising: a memory storing network data associated with a plurality of client devices at a site, wherein the plurality of client devices includes one of wired client devices at the site with access to a wired network or wireless client devices connected to one or more access point (AP) devices to access a wireless network provided by the AP devices at the site; and one or more processors coupled to the memory and configured to: in response to an initial network connection session event determined from the network data associated with a given client device, initiate a stateful machine for the given client device configured to continuously monitor states of a connection session for the given client device based on event data determined from the network data associated with the given client device, wherein the states of the connection session include at least one pre-connection state and at least one post-connection state; determine, based on a plurality of stateful machines for the plurality of client devices at the site, one or more network connection assessments for the plurality of client devices at the site, wherein the one or more network connection assessments include a success or failure of the connection session for the given client device; and in response to determining at least one failure from the network connection assessments for the plurality of client devices at the site, output a notification including identification of a root cause of the failure.

In another example, the disclosure describes a method comprising: in response to an initial network connection session event determined from network data associated with a plurality of client devices at a site, wherein the plurality of client devices includes one of wired client devices at the site with access to a wired network or wireless client devices connected to one or more access point (AP) devices to access a wireless network provided by the AP devices at the site, the network data associated with a given client device, initiating a stateful machine for the given client device configured to continuously monitor states of a connection session for the given client device based on event data determined from the network data associated with the given client device, wherein the states of the connection session include at least one pre-connection state and at least one post-connection state; determining, based on a plurality of stateful machines for the plurality of client devices at the site, one or more network connection assessments for the plurality of client devices at the site, wherein the one or more network connection assessments include a success or failure of the connection session for the given client device; and in response to determining at least one failure from the network connection assessments for the plurality of client devices at the site, outputting a notification including identification of a root cause of the failure.

In another example, the disclosure describes a non-transitory computer-readable storage medium comprising instructions that, when executed, configure processing circuitry to: in response to an initial network connection session event determined from network data associated with a plurality of client devices at a site, wherein the plurality of client devices includes one of wired client devices at the site with access to a wired network or wireless client devices connected to one or more access point (AP) devices to access a wireless network provided by the AP devices at the site, the network data associated with a given client device, initiate a stateful machine for the given client device configured to continuously monitor states of a connection session for the given client device based on event data determined from the network data associated with the given client device, wherein the states of the connection session include at least one pre-connection state and at least one post-connection state; determine based on a plurality of stateful machines for the plurality of client devices at the site, one or more network connection assessments for the plurality of client devices at the site, wherein the one or more network connection assessments include a success or failure of the connection session for the given client device; and in response to determining at least one failure from the network connection assessments for the plurality of client devices at the site, output a notification including identification of a root cause of the failure.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
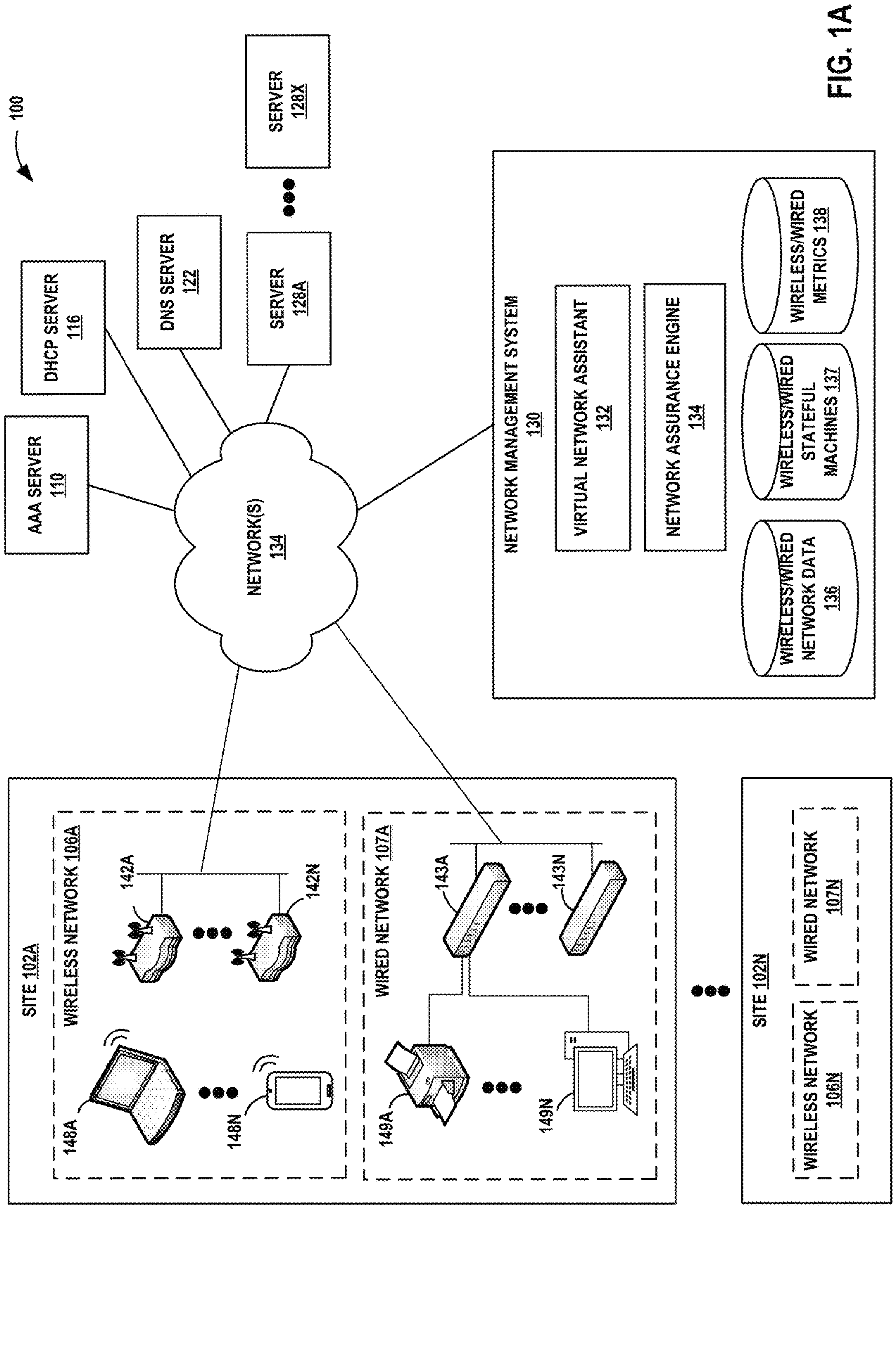
FIG. 1A is a diagram of an example network system 100 in which a network management system determines one or more wireless and/or wired successful connects metrics, in accordance with one or more techniques of the disclosure.

FIG. 1A is a diagram of an example network system 100 in which a network management system (NMS) 130 monitors performance of one or more wireless and/or wired networks based on one or more network connection assessments, in accordance with one or more techniques of the disclosure. The network connection assessments may include, for example, one or more wireless successful connects metrics and/or one or more wired successful connects metrics. Example network system 100 includes one or more wireless networks 106A-106N (collectively, "wireless networks 106") and/or one or more wired networks 107A-107N (collectively, "wired networks 107") deployed for an organization or enterprise at one or more sites 102A-102N, respectively. In the example of FIG. 1A, each site 102A-102N includes a single wireless network 106A-106N and a single wired network 107A-107N, respectively. However, each of sites 102A-102N may include one or more wireless networks 106 and/or one or more wired networks 107, and the disclosure is not limited in this respect.

Sites 102A-102N (collectively, "sites 102), such as offices, hospitals, airports, stadiums, or retail outlets, often install complex wired and/or wireless network systems to provide networking services to one or more client devices at the site. For example, a wireless network 106 may include a plurality of wireless access point (AP) devices, e.g., AP devices 142, deployed throughout the premises to provide wireless network services to one or more wireless client devices 148A-148N. In this example, site 102A includes a plurality of AP devices 142A-142N. Each AP device 142 may be any type of wireless access point, including, but not limited to, a commercial or enterprise access point, a router, or any other device capable of providing wireless network access.

Each site 102A-102N also includes a plurality of wireless client devices 148-148N (also referred to as user equipment devices (UEs)) representing various wireless-enabled devices at each site. For example, a plurality of wireless client devices 148A-148N are currently located at site 102A. Examples of wireless client devices 148 may include, but are not limited to, a mobile device such as a smartphone, tablet or laptop computer, a personal digital assistant (PDA), a wireless terminal, a smart watch, smart ring or other wearable device. Wireless client devices 148 may also include wireless IoT client devices such as printers, security devices, environmental sensors, appliances, or any other device configured to communicate over one or more wireless networks.

As another example, each of wired networks 107A-107N includes a plurality of wired network devices, e.g., such as one or more of hubs, switches, a routers, etc., through which one or more wired client devices are physically connected to access the respective wired network at the site. In this example, site 102A includes a plurality of wired network devices 143A-143N. Each wired network device 143 may include any type of wired network device including, but not limited to, a hub, a switch, a router, a network infrastructure device, or any other device capable of providing wired network access to one or more wired client devices. A plurality of wired client devices 149A-149N are currently located at site 102A. Each wired client device 149A-149N is physically connected to one of wired devices 143A-143N in order to access wired network 107A. Examples of wired client devices 149A-149N may include, but are not limited to, desktop computers, wired IoT client devices such as printers, security devices, environmental sensors, appliances, or any other device configured to communicate over one or more wired networks.

Example network system 100 also includes various networking components for providing networking services for the wireless and/or wired networks including, as examples, an Authentication, Authorization and Accounting (AAA) server 110 for authenticating users and/or wireless clients 148, a Dynamic Host Configuration Protocol (DHCP) server 116 for dynamically assigning network addresses (e.g., IP addresses) to wireless clients 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, wireless client devices 148, NMS 130, wired client devices 149, hub/switch devices 143, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N and/or wired networks 107A-107N at one or more of sites 102A-102N. In such examples, NMS 130 provides network data acquisition, monitoring, activity logging, reporting, predictive analytics, network anomaly identification, and alert generation. NMS 130 may include one or more processors or computing devices, dedicated servers, virtual machines, containers, services, or other forms of environments for performing the techniques described herein. In some examples, network management system 130 may be configured to proactively monitor and adaptively configure network 100 so as to provide self-driving capabilities based on one or more network connection assessments, such as one or more wireless successful connects metric(s) and/or one or more wired successful connects metric(s), in accordance with one or more techniques of the disclosure.

NMS 130 monitors and analyzes wireless and/or wired network data 136 associated with each of wireless networks 106 and/or wired networks 107 at each site 102 to deliver a high-quality wireless and/or wired network experience to wireless and/or wired client devices and thus to end users at the sites. Wireless/wired network data 136 may be stored in one or data storage device(s), which may be part of or otherwise associated with NMS 130, in an external database, or other appropriate storage locations.

Example NMS 130 includes a virtual network assistant (VNA) 132 and a network assurance engine 134. The functions of VNA 132 and network assurance engine 134 may be carried out by NMS 130 itself or may be distributed among one or more separate or associated systems, servers, processors or computing devices, etc. VNA 132 analyzes network data to provide real-time insights and simplified troubleshooting for IT operations. VNA 132 may include a natural language processing engine to provide AI-driven support and troubleshooting, anomaly detection, AI-driven location services, and AI-driven RF (wireless) optimization with reinforcement learning for wireless networks 106 and/or wired networks 107

In some examples, VNA 132 automatically takes remedial action or provides recommendations to proactively address or mitigate network issues. VNA 132 may, for example, include a network data processing platform configured to process hundreds or thousands of concurrent streams of network data from wired and/or wireless client devices, AP, switches, routers, and/or any other wired or wireless device associated with networks 106 and/or 107. VNA 132 may include an underlying analytics and network error (e.g., anomaly) identification engine and alerting system. VNA 132 may further provide real-time alerting and reporting to notify administrators or IT personnel of any predicted events, anomalies, trends, and may perform root cause analysis and automated or assisted anomaly remediation.

In some examples, VNA 132 of NMS 130 may apply machine learning techniques to detect network scope failure and identify the root cause of error conditions detected from the streams of wireless network data and/or wired network data. VNA 132 may generate a notification indicative of the root cause and/or one or more remedial actions that may be taken to address the root cause of the error conditions. In some examples, if the root cause may be automatically resolved, VNA 132 invokes one or more remedial or mitigating actions to address the root cause of the error condition, thus automatically improving the underlying performance of the wireless and/or wired networks, and thus also automatically improving the user experience of the wireless and/or wired networks.

Computational resources and components implementing VNA 132 may be part of the NMS 130, may execute on other servers or execution environments, or may be distributed to nodes within network 100 (e.g., routers, switches, controllers, gateways and the like). Example details of these and other operations implemented by the VNA 132 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

Network assurance engine 134 of NMS 130 automatically determines one or more service level experience (SLE) metrics 138 for each wireless client device 148 associated with wireless networks 106 and/or for each wired client device 149 associated with wired networks 107. Network assurance engine 134 further aggregates the wireless/wired metrics for each of a plurality of wireless/wired client devices to determine aggregated SLE metrics for the wireless/wired networks, respectively. The wireless/wired metrics 138 determined based on the collected wireless/wired network data 136 can be used to measure various aspects of wireless and/or wired network performance, respectively.

In accordance with one or more techniques of the disclosure, the network connection assessments may include one or more wireless successful connects metrics and/or one or more wired successful connects metrics, collectively shown in FIG. 1A as wireless/wired metrics 138. To determine the wireless successful connects metrics, network assurance engine 134 of NMS 130 is configured to monitor, for each of a plurality of wireless client devices and for each of a plurality of wireless connection sessions, one or more pre-connection and/or post-connection states using a per-wireless client stateful machine for the duration of each wireless connection session. The wireless successful connects metrics are indicative of the extent to which wireless clients are able to successfully connect and remain connected to a wireless network for the duration of the wireless connection session.

Similarly, to determine the wired successful connects metrics, network assurance engine 134 of NMS 130 is configured to monitor, for each of a plurality of wired client devices and for each of a plurality of wired connection sessions, one or more pre-connection and/or post-connection states using a per-wired client stateful machine for the duration of the wired connection session. The wired successful connects metrics indicative of the extent to which wired clients are able to successfully connect and remain connected to a wired network for the duration of the wired connection session.

The pre-connection and/or post-connection states for wireless client devices and wired client devices may include one or more of the same states, and/or one or more different states. The wireless pre-connection and post-connection states may include, for example, an association state, an authorization state, a Dynamic Host Configuration Protocol (DHCP) discover/renew state, an Address Resolution Protocol (ARP) state, and a Domain Name System (DNS) state. In general, the association state and the authorization states are pre-connection wireless states. The ARP and DNS states are post-connection wireless states. The DHCP discovery state is a pre-connection state and the DHCP renew state is a post-connection wireless state. The wired successful connect metric classifiers may include, for example, a DHCP classifier and an authentication classifier. The authentication classifier reflects a pre-connection state. The DHCP classifier includes one or more sub-classifiers that reflect pre-connection state(s) and one or more sub-classifiers that reflect post-connection state(s).

Network assurance engine 134 further determines, for each of the plurality of wireless client devices, a wireless successful connects metric and one or more classifiers and/or sub-classifiers for each of a plurality of connection sessions. Each of the wireless successful connects metric classifiers corresponds to one of the wireless pre-connection or post-connection states. The wireless successful connects classifiers may include, for example, an association classifier corresponding to the association state, an authorization classifier corresponding to the authorization state, a Dynamic Host Configuration Protocol (DHCP) classifier corresponding to the DHCP state, an Address Resolution Protocol (ARP) classifier corresponding to the ARP state, and a Domain Name System (DNS) classifier corresponding to the DNS state.

Network assurance engine 134 aggregates the pre-connection and post-connection wireless metrics/classifiers/sub-classifiers determined for a plurality of wireless devices over one or more selected periods of time to determine an overall score for the wireless successful connects metrics and for each corresponding classifier/sub-classifier. For example, the score for the aggregated wireless successful connects metric may be expressed as a percentage or an absolute number of successful wireless connection sessions during a selected period of time. As another example, the score for the wireless successful connects metric classifiers/sub-classifiers may be expressed as a percentage or an absolute number of connection sessions that experienced a failure for the corresponding state as compared to the total number of connection sessions that experienced a failure during a selected period of time. In this way, the NMS 130 attributes failures by wireless clients to successfully connect and remain connected to the wireless network for the duration of a wireless connection session to the wireless pre-connection and/or post-connection classifiers/sub-classifiers, thus providing guidance to IT personnel to troubleshoot and address wireless connection issues, and/or enabling the NMS 130/VNA 132 to automatically identify and invoke remedial action intended to address or mitigate the pre-connection or post-connection issues.

Network assurance engine 134 further determines, for each of the plurality of wired client devices, a wired successful connects metric and one or more classifiers and/or sub-classifiers for each of a plurality of wired connection sessions. Each of the wired successful connects metric classifiers corresponds to one of the wired pre-connection or post-connection states. The wired successful connects classifiers may include, for example, a wired authentication classifier corresponding to the wired authentication state, and a wired Dynamic Host Configuration Protocol (DHCP) classifier corresponding to the wired DHCP state.

Network assurance engine 134 of NMS 130 may also aggregate the pre-connection and post-connection classifiers for a plurality of wired client devices over one or more selected periods of time to determine an overall score for the wired successful connects metric and corresponding classifiers/sub-classifiers. For example, the score for the wired successful connects metric may be expressed as a percentage or an absolute number of wired clients that successfully connected to the wired network during a selected period of time. As another example, the score for the wired successful connects metric classifiers/sub-classifiers may be expressed as a percentage or an absolute number of wired connection sessions that experienced a failure for the corresponding state as compared with a total number of wired connection sessions that experienced a failure during a selected period of time. In this way, the NMS 130 attributes failures by wired clients to successfully connect and remain connected to the wired network for the duration of a wired connection session to the wireless pre-connection and/or post-connection classifiers/sub-classifiers, thus providing guidance to IT personnel to troubleshoot and address wired connection issues, and/or enabling the NMS 130/VNA 132 to automatically identify and invoke remedial action intended to address or mitigate the pre-connection or post-connection issues.

Based on the wireless and/or wired successful connects metric(s) and their classifiers/sub-classifiers, NMS 130 may identify one or more anomalies in network performance with respect to the ability of client devices to successfully connect to the respective wireless and/or wired network. NMS 130 may further identify a root cause of the identified anomalies, and/or automatically invoke one or more remedial actions to address the root cause of the identified anomalies.

In a wireless network 106, AP devices 142 are configured to report event data for each wireless device 148 (stored as, for example, wireless network event data 136) indicative of each network event during a wireless connection session. At the start of each wireless connection session, NMS 130 initiates a wireless client-specific stateful machine configured to continuously monitor one or more pre-connection and/or post-connection states of the wireless connection session based the network event data received from the one or more AP devices. NMS 130 classifies each pre-connection or post connection state as one of "success" or "fail" based on the network event data. If all states of a wireless connection session are classified "success" for the duration of the wireless connection session, then the client-specific wireless successful connect metric for that wireless connection session is classified as "success." If any one of the states of the wireless connection session are classified as "fail," then the corresponding classifier/sub-classifier is classified as "fail" and the client-specific wireless successful connect metric for that wireless connection session is also classified as "fail."

Similarly, NMS may implement a per-client state machine for each of a plurality of wired connection sessions, and determine one or more wired successful connects metrics/classifiers/sub-classifiers based on status data received for each of the plurality of wired client devise (stored as, for example, wired network data 136).

In accordance with one or more techniques of the disclosure, NMS 130 may initiate a per-client stateful machine for millions of active wireless and/or wired client devices in a given day. The use of a stateful machine, compared to a stateless machine, may be especially advantages when monitoring the post-connection states of a wireless or wired connection session. The post-connection states represent ongoing processes that occur continuously or periodically for the duration of the connection session. The post-connection states also comprise processes that may result in heavy noise or static when handled using an ad-hoc, stateless machine for each network event. For example, when attempting to connect to a network, a client device may send multiple DNS requests (e.g., to multiple DNS servers) and multiple DNS failure responses may be returned along with one successful DNS response. In a wireless network example, an AP device may report the DNS success event as well as each of the individual DNS failure events to NMS 130. In accordance with one or more techniques of the disclosure, the per-client wireless stateful machine implemented by network assurance engine 134 aggregates the successful DNS event and the multiple failed DNS events and classifies the corresponding DNS state for the connection session as a "success." In this way, false positive events (e.g., the multiple the DNS failure events in this example) and/or true negative events do not impact the client-specific DNS state classifier score, the client-specific successful connects metric/classifier/sub-classifier scores, or the aggregated successful connects metric/classifier/sub-classifier scores for the plurality of client devices. The multiple DNS fail events may be considered "noise" that is essentially filtered out by network assurance engine 134 when determining whether the DNS state should be classified as "success" or "fail." In this way, neither IT personnel nor the NMS 130 need concern themselves with false positive DNS failure events that do not truly impact the wireless client devices or effect the experience of users of the wireless network.

For wired client devices, NMS 130 receives periodic status updates for each wired device connected to attempting to connect to a wired network. For example, a wired client device may send a status update every 1 minute, and these periodic status updates are forwarded to NMS 130 via a connected one of switches 143. In accordance with one or more techniques of the disclosure, for each wired client device, NMS 130 maps the status updates to one or more pre-connection and/or post-connection states of a per-client wired stateful machine. In this way, false positive events (e.g., one or more ad hoc failure events that are followed by a success event) and/or true negative events do not impact the client-specific successful connects metric/classifier/sub-classifier scores, the aggregated successful connects metric/classifier/sub-classifier scores for the plurality of client devices. The multiple DNS fail events may be considered "noise" that is essentially filtered out by network assurance engine 134 when determining whether the DNS state should be classified as "success" or "fail." In this way, neither IT personnel nor the NMS 130 need concern themselves with false positive DNS failure events that do not truly impact the wireless client devices or effect the experience of users of the wireless network.

Figure 1B:
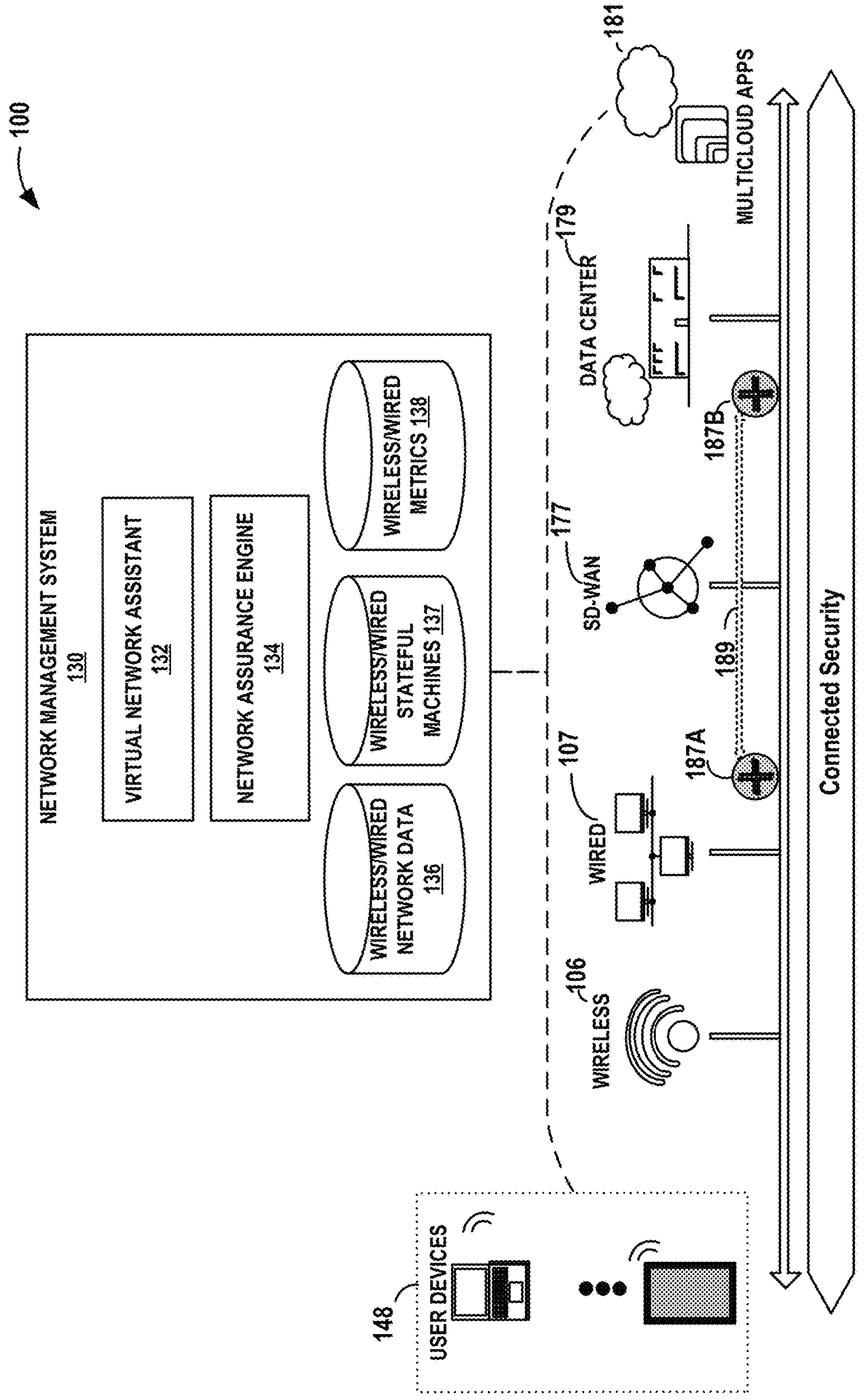
FIG. 1B is a block diagram illustrating further example details of the network system of FIG. 1A.

FIG. 1B is a block diagram illustrating further example details of the network system of FIG. 1A. As illustrated in the example of FIG. 1B, AI-driven NMS 130 also provides configuration management, monitoring and automated oversight of a software defined wide-area network (SD-WAN) 177, which operates as an intermediate network communicatively coupling wireless networks 106 and wired LANs 107 to data centers 179 and application services 181. In general, SD-WAN 177 provides seamless, secure, traffic-engineered connectivity between "spoke" routers 187A of edge wired networks 107 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur.

Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992, 543, entitled "Automatically generating an intent-based network model of an existing computer network," each of which is hereby incorporated by reference.

Figure 2:
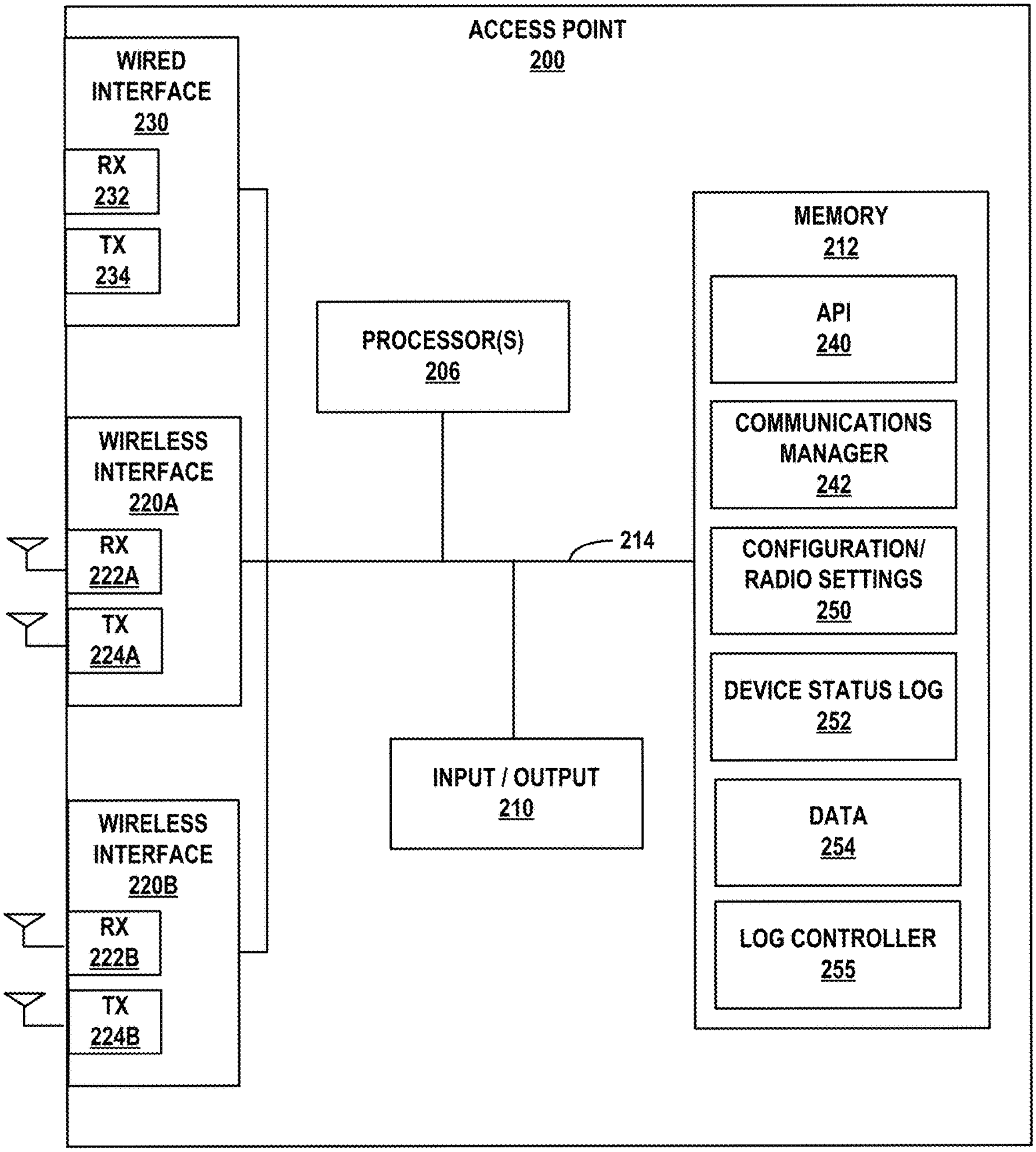
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIGS. 1A-1B. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as wireless clients 148 of FIG. 1A. First and second wireless interfaces 220A and 220B further include transmitters 224A and 224B, respectively, each including transmit antennas via which access point 200 may transmit wireless signals to wireless communications devices, such as wireless clients 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the wireless client devices 148 and transmitted to AP device 200, may be measured by AP device 200 itself or by any other device associated with the wireless network and transmitted to AP device 200. The network data may further include event data corresponding to one or more network connectivity events for each of a plurality of wireless client devices associated with (or attempting to associate with) AP 200 during one or more wireless connection sessions.

Network data stored in data 254 may include, for example, AP events and/or wireless client events. In some examples, the network events are classified as positive network events (otherwise referred to herein as "successful network events" or "successful events"), neutral network events, and/or negative network events (otherwise referred to herein as "fail" network events" or "fail events"). The network events may include, for example, memory status, reboot events, crash events, Ethernet port status, upgrade failure events, firmware upgrade events, configuration changes, authentication events, DNS events, DHCP events, one or more types of roaming events, one or more types of proximity events, client authentication events (e.g., success and/or failures), etc., as well as a time and date stamp for each event. Log controller 255 determines a logging level for the device based on instructions from NMS 130. Data 254 may store any data used and/or generated by access point device 200, including data collected from wireless clients 148, such as successful events, failure events, and/or neutral events, that is transmitted by access point device 200 to NMS 130 for cloud-based management of wireless networks 106A by NMS 130.

Communications manager 242 includes program code that, when executed by processor(s) 206, allow access point 200 to communicate with wireless clients 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3A:
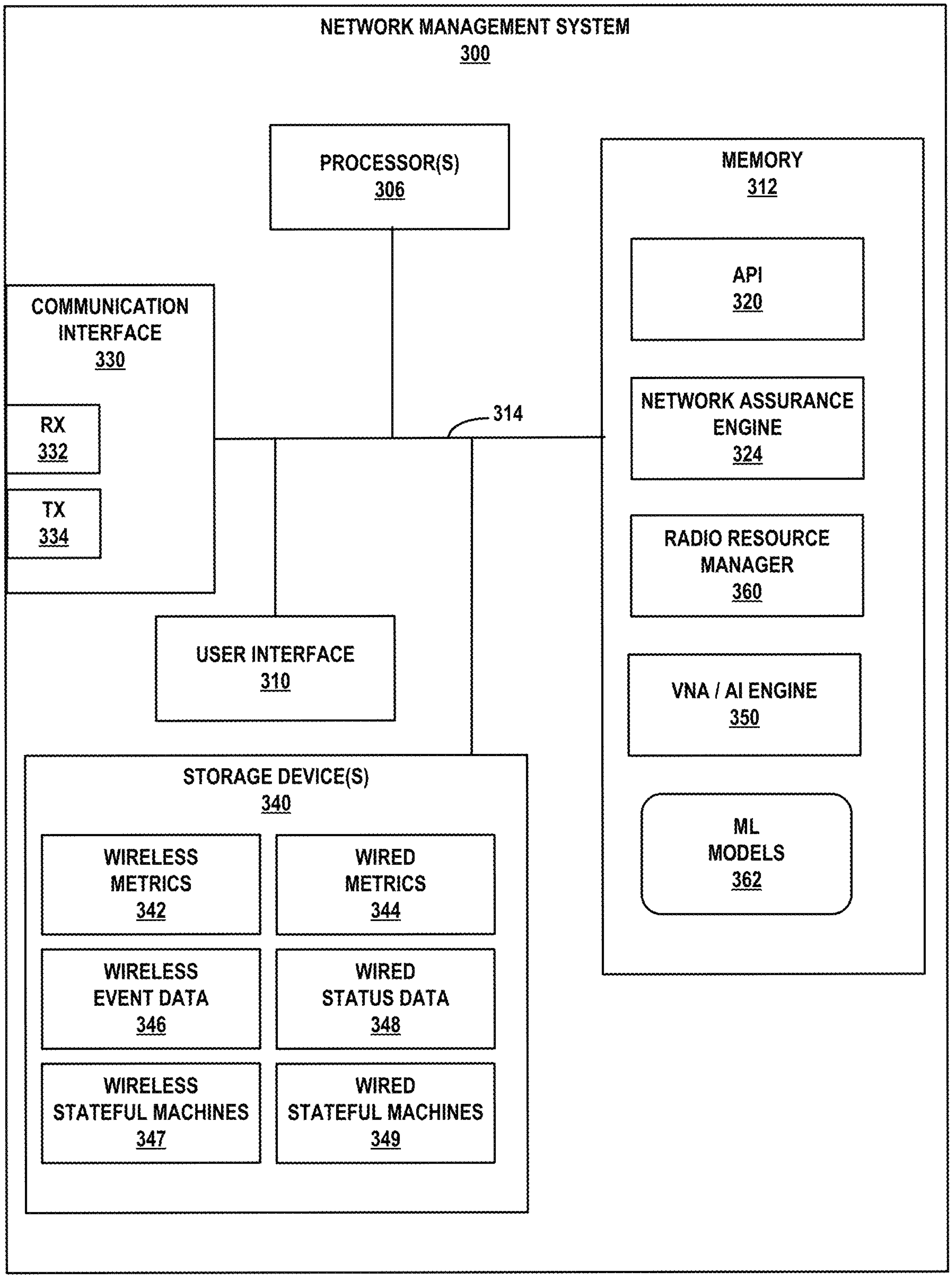
FIG. 3A is a block diagram of an example network management system configured to determine one or more wireless and/or wired successful connects metrics, in accordance with one or more techniques of the disclosure.

FIG. 3A is a block diagram of an example network management system 300 configured to determine one or more of a wireless successful connects metric and/or a wired successful connects metric, in accordance with one or more techniques of the disclosure. In the example of FIG. 3A, NMS 300 may be used to implement, for example, NMS 130 in FIG. 1A. In such examples, NMS 300 is responsible for monitoring and management of one or more wireless networks 106 and/or one or one or more wired networks 107 at one or more sites 102. In some examples, NMS 300 may be part of a cloud-based computing platform such as NMS 130 as shown in FIG. 1A or a part of any other server or computing system. NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to one or more computer-readable storage mediums (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, client devices 148, servers 110, 116, 122, 128 and/or any other devices or systems forming part of network 100 such as shown in FIG. 1A. NMS 300 further includes a database 340. The data and information received by NMS 300 may include, for example, wireless event data 346 and wired status data 348 used by NMS 300 to remotely monitor and/or control the performance of wireless networks 106 and wired networks 107, respectively. NMS further determines one or more wireless service level metrics 342 and one or more wired service level metrics 344 based on the wireless event data 346 and the wired status data 348, respectively. NMS may further transmit data via communications interface 330 to any of network devices such as AP devices 142 at any of network sites 102A-102N to remotely manage wireless networks 106 and/or wired networks 107.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, network assurance engine 324, a radio resource management (RRM) engine 360, a virtual network assistant (VNA)/AI engine 362, and one or more machine learning models 362. NMS 300 may also include any other programmed modules, software engines and/or interfaces configured for remote monitoring and management of wireless networks 106 and/or wired networks 107. RRM engine 360 monitors one or more metrics for each wireless network 106 in order to learn and optimize the radio-frequency (RF) environment at each site. For example, RRM engine 360 may monitor coverage and capacity metrics (e.g., determined by network assurance module 324) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all AP devices 142 in each wireless network 106. RRM engine 360 may monitor events, power, channel, bandwidth, and number of clients connected to each AP device. RRM engine 360 may further automatically change or update configurations of one or more AP devices 142 at a site 106 with an aim to improve the coverage and/or capacity metrics and thus to provide an improved wireless experience for the user.

VNA/AI engine 350 analyzes network data received from AP devices 142 as well as its own data to monitor performance of wireless networks 106 and/or wired networks 107. For example, VNA engine 350 may identify when anomalous or abnormal states are encountered in one of wireless networks 106 and/or wired networks 107. VNA/AI engine 350 may further identify the root cause of any anomalous or abnormal states and/or invoke one or more corrective actions aimed at addressing the root cause of any anomalous or abnormal states in the wireless networks 106 and/or wired networks 107.

VNA/AI engine 350 may, in some examples, construct, train, apply and retrain supervised and/or unsupervised ML model(s) 362 to event data to determine whether the collected network event data represents anomalous behavior that needs to be further analyzed by VNA/AI engine 350 to facilitate identification and resolution of faults. VNA/AI engine 350 may then apply the ML model 362 to data streams and/or logs of newly collected data of various network event types (e.g., statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 362 to newly collected data indicates that mitigation is required, VNA/AI engine 350 may identify a root cause of the anomalous system behavior and, if possible, trigger automated or semi-automated corrective action. In this way, VNA/AI engine 350 may construct and apply a ML model 362 based on a particular complex network to determine whether to perform further, resource-intensive analysis on incoming streams of path data collected (e.g., in real-time) from network devices within the complex network system.

In addition, VNA/AI engine 350 may automatically invoke one or more remedial actions intended to address the identified root cause(s) of identifies wireless or wired network anomalies. Examples of remedial actions that may be automatically invoked by VNA/AI engine 350 may include, but are not limited to, invoking RRM 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. In some examples, the remedial actions may include restarting a server. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless or wired network operation.

In accordance with one or more techniques of the disclosure, the wireless metrics 342 include a wireless successful connects metric and the wired metrics 344 include a wired successful connects metric. NMS 300 remotely monitors and/or evaluates performance of wireless and/or wired networks based on the wireless successful connects metric and/or the wired successful connects metric, respectively. For a wireless network, for example, NMS 300 initiates a plurality of per-wireless client stateful machines 347 for each of a plurality of wireless connection sessions. NMS 300 monitors and evaluates one or more pre-connection and post-connection states of each of the plurality of wireless stateful machines 347 for the duration of the wireless connection session based on the wireless event data 346 to determine a wireless successful connects metric. The wireless successful connects metric is indicative of the extent to which wireless clients are able to successfully connect to the wireless network.

For a wired network, for example, NMS 300 initiates a plurality of per-wired client stateful machines 349 for each of a plurality of wired connection sessions. NMS 300 monitors and evaluates one or more pre-connection and post-connection states of each of the plurality of wired stateful machines 349 for the duration of the wired connection session based on the wired status data 348 to determine a wired successful connects metric. The wired successful connects metric is indicative of the extent to which wired clients are able to successfully connect to the wired network.

Figure 3B:
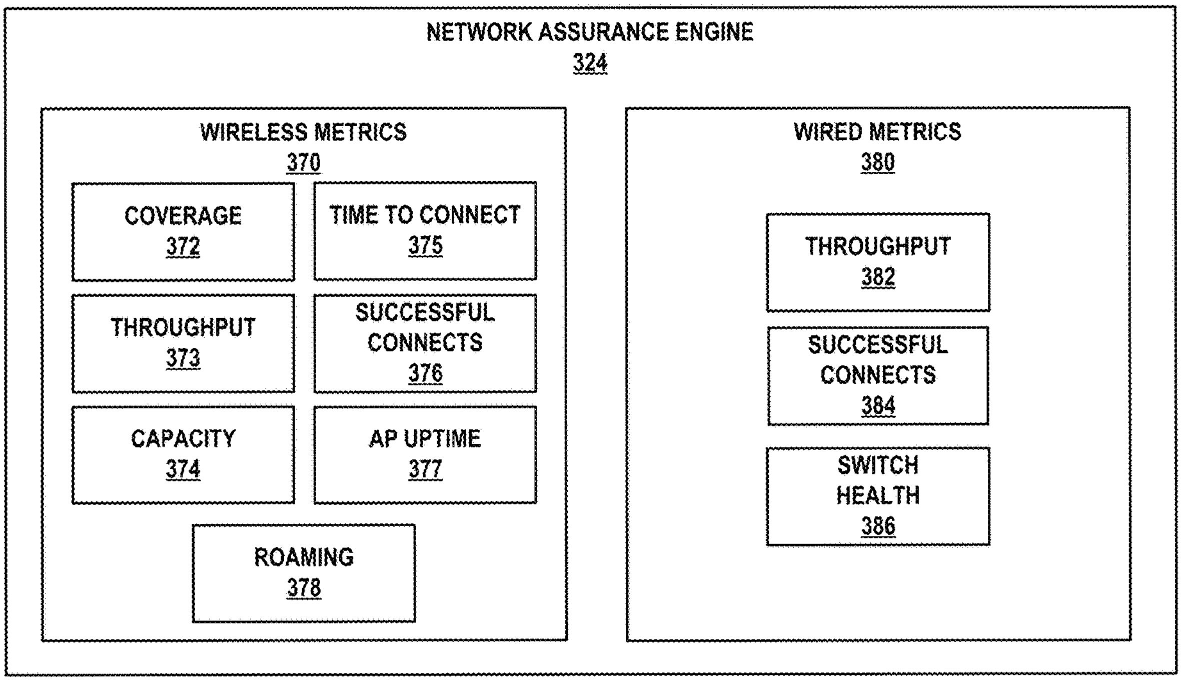
FIG. 3B is a block diagram illustrating further example details of a SLE metric module of the network management system from FIG. 3A.

FIG. 3B is a more detailed block diagram of network assurance engine 324. Network assurance engine 324 includes one or more modules for determining one or more wireless and/or one or more wired service level metrics. In this example, a wireless metric module 370 includes a roaming metric module 378, a coverage metric module 372, a throughput metric module 373, a capacity metric module 374, a time to connect metric module 375, a successful connects metric module 376 and an AP health metric module 377. Wireless metric module 370 may include some or all of these modules and may also include other modules for determination of other wireless network performance metrics.

Example wired metric module 380 includes a throughput module 382, a successful connects module 384, and a switch health module 386. Wired metric module 380 may include some or all of these modules and may also include other modules for determination of other wired network performance metrics.

In accordance with one or more techniques of the disclosure, wireless successful connects metric module 376, when executed by one or more processors such as processors 306 of NMS 300 or by other associated processors or computing system, analyzes wireless event data indicative of one or more pre-connection and post-connection states on a per-wireless client basis to determine a wireless successful connects metric. The wireless successful connects metric is indicative of the extent to which wireless clients are able to successfully connect and remain connected to the wireless network for the duration of a wireless connection session. The wireless successful connects metric may include one or more classifiers and/or sub-classifiers that further attribute wireless connection failures for a plurality of wireless client devices to one or more of the pre-connection and/or post-connection states. In this way, failures by wireless clients to successfully connect to the wireless network are attributed to the wireless pre-connection and/or post-connection classifiers/sub-classifiers, thus helping IT personnel to diagnose and address wireless connection issues, and/or enabling the NMS 130 to automatically identify the root cause and/or invoke remedial action to address the root cause of any pre-connection or post-connection wireless issues.

The wireless successful connects classifiers/sub-classifiers further identify one or more pre-connection or post-connection states where wireless client devices fail during their attempts to connect (or remain connected) to the wireless network for the duration of a wireless connection session. For example, the wireless successful connects classifiers/sub-classifiers may include:

(1) Association classifier: a pre-connection state classifier indicative of the success or failure of the wireless device to achieve association with an AP of the wireless network (i.e., whether the association state was successful).

(2) Authorization classifier: a pre-connection state classifier indicative of the success or failure of the wireless client device to achieve authorization to join the wireless network (i.e., whether a correct password to join the wireless network was received from the wireless client device).

(3) Dynamic Host Configuration Protocol (DHCP) classifier: indicative of the success or failure of the wireless device to complete all phases of DHCP operations. The DHCP classifier may include, for example, the following sub-classifiers that reflect intermediate states during the DHCP process during which a wireless client device may experience a failure:

a. Discover Unresponsive (pre-connection): The DHCP unresponsive state is set to "fail" when a wireless client does not receive a DHCP discover response from the DHCP server within an allotted time out period.

b. DHCP Incomplete (pre-connection): The DHCP incomplete state is set to "fail" when, for example, the DHCP server offers an IP address to the wireless client, but the client does not respond within an allotted time out period.

c. Negative Acknowledge (NACK) (pre-connection or post-connection): The NACK message is sent to a wireless client to indicate that the IP address that the client has requested (either during pre-connection DHCP discover or post-connection DHCP renew) cannot be provided by the DHCP server. This situation can occur when a client requests an invalid or duplicate address for the network. If wireless event data indicates that the wireless client received a negative acknowledgment, the NACK state for the wireless client DHCP NACK sub-classifier is set to "fail."

d. Renew Unresponsive (post-connection): The renew unresponsive state is set to "fail" when a wireless client does not receive a DHCP renew response from the DHCP server within an allotted time out period.

(4) Address Resolution Protocol (ARP) classifier: A post-connection state classifier indicative of the success or failure of the wireless client device to complete the ARP process. For example, an ARP state of a wireless client may be set to fail in the event of an ARP timeout, an ARP transaction failure, or when a client continuously/excessively sends ARP requests to a gateway.

(5) Domain Name System (DNS) classifier: a post-connection state classifier indicative of the success or failure of a wireless device to complete a DNS query. For example, a wireless client DNS state of a wireless client may be set to fail if the domain name queried does not exist, an answer cannot be given, or the DNS server refused to answer.

In accordance with one or more techniques of the disclosure, wired successful connects metric module 384, when executed by one or more processors such as processors 306 of NMS 300, analyzes wired status data (e.g., wired data 136/348) periodically received by NMS 300 corresponding to one or more pre-connection and post-connection states on a per-wired client basis to determine a wired successful connects metric. The wired successful connects metric is indicative of the extent to which wired clients are able to successfully connect (or remain connected) to the wired network. The wired successful connects metric may include one or more classifiers and/or sub-classifiers that further attribute wired connection failures for a plurality of wired client devices to one or more of the pre-connection and/or post-connection states. In this way, failures by wired clients to successfully connect to the wired network are attributed to the wired pre-connection and/or post-connection classifiers/sub-classifiers, thus helping IT personnel to diagnose and address wired connection issues, and/or enabling the NMS 130 to automatically identify the root cause and/or invoke remedial action to address the root cause of any pre-connection or post-connection wired issues.

The wired successful connects classifiers/sub-classifiers further identify one or more pre-connection or post-connection states where wired client devices fail during their attempts to connect (or remain connected) to the wired network during a wired connection session. For example, the wired successful connects classifiers/sub-classifiers may include:

(1) DHCP classifier: For wired clients, the DHCP classifier is indicative of whether the wired client was able to complete the DHCP process and remain bound to the wired network.

(2) Authentication classifier: a pre-connection state classifier indicative of the success or failure of the wired device to achieve authentication to the wired network.

Figure 4:
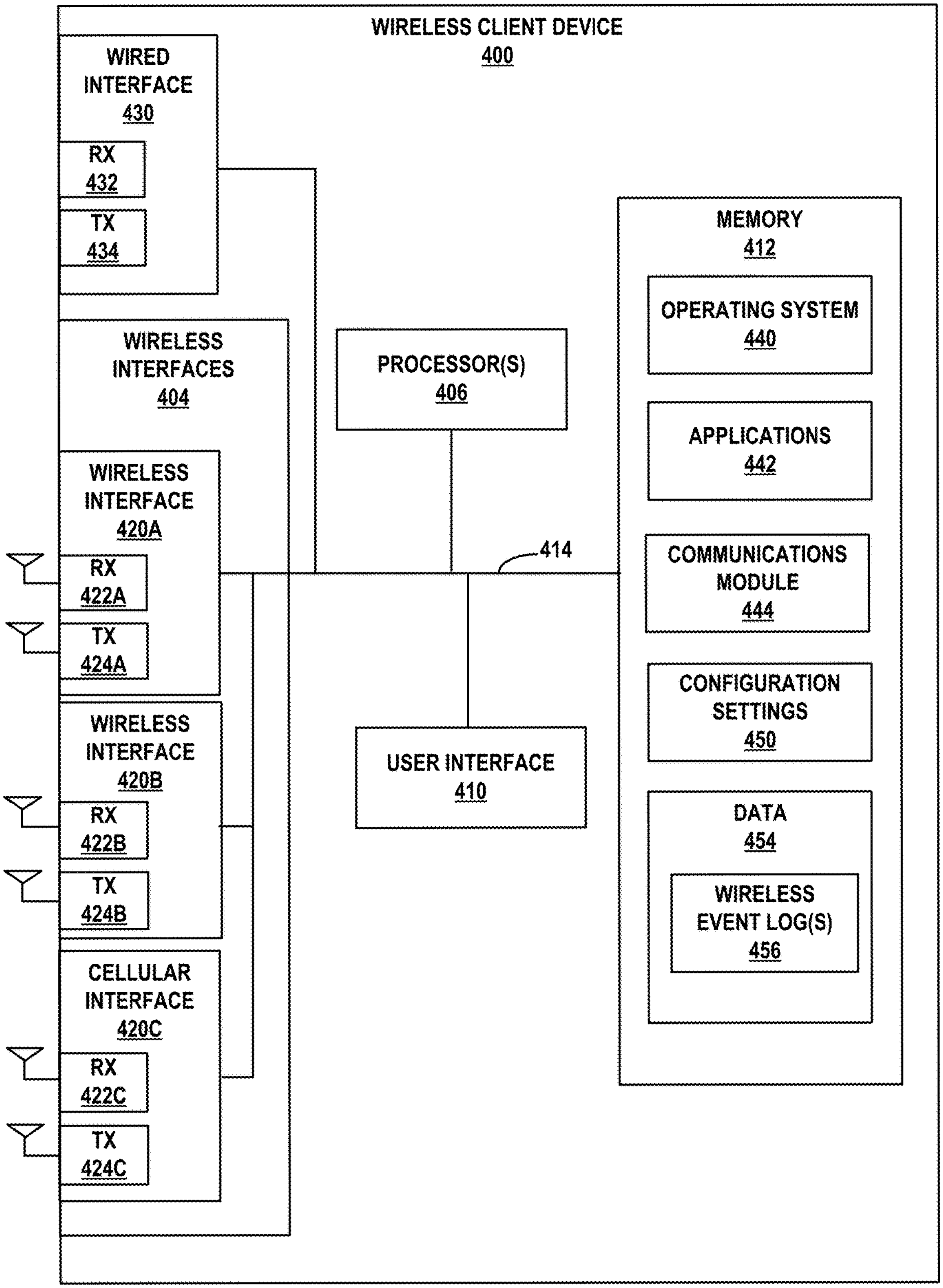
FIG. 4 is a block diagram of an example user equipment (e.g., wireless client) device in accordance with one or more techniques of the disclosure.

FIG. 4 shows an example wireless client device 400 (also referred to as "wireless client 400). Example wireless client 400 shown in FIG. 4 may be used to implement any of wireless client devices 148 as shown and described herein with respect to FIG. 1A. Wireless client device 400 may include any type of wireless client device, and the disclosure is not limited in this respect. For example, wireless client device 400 may include a mobile device such as a smart phone, tablet or laptop computer, a personal digital assistant (PDA), a wireless terminal, a smart watch, a smart ring or any other type of mobile or wearable device. Wireless client 400 may also include any type of wireless IoT client device such as a printer, a security sensor or device, an environmental sensor, or any other connected device configured to communicate over one or more wireless and/or wired networks.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein. In this example, memory 412 includes an operating system 440, applications 442, a communications module 444, configuration settings 450, and data storage for network data 454.

Network data 454 may be stored in wireless client memory 412 and transmitted to NMS 130/300 via the wireless network or wired network to which wireless client is associated. The network data 454 may include wireless pre-connection and/or post-connection event log data 456 indicative of the wireless client's pre-connection and post-connection states during the duration of one or more wireless connection sessions.

Wireless client device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple wireless client 400 to network(s) 134 of FIG. 1A. First, second and third wireless interfaces 420A, 420B, and 420C include receivers 422A, 422B, and 422C, respectively, each including a receive antenna via which wireless client 400 may receive wireless signals from wireless communications devices, such as AP devices 142 of FIG. 1A, AP device 200 of FIG. 2, other wireless clients 148, or other devices configured for wireless communication. First, second, and third wireless interfaces 420A, 420B, and 420C further include transmitters 424A, 424B, and 424C, respectively, each including transmit antennas via which wireless client 400 may transmit wireless signals to wireless communications devices, such as AP devices 142 of FIG. 1A, AP device 200 of FIG. 2, other wireless clients 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which wireless client device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform one or more techniques described herein.

Communications module 444 includes program code that, when executed by processor(s) 406, enables wireless client 400 to communicate using any of wired interface(s) 430, wireless interfaces 420A-420B and/or cellular interface 450C. Configuration settings 450 include any device settings for wireless client 400 settings for each of wireless interface(s) 420A-420B and/or cellular interface 420C.

Figure 5:
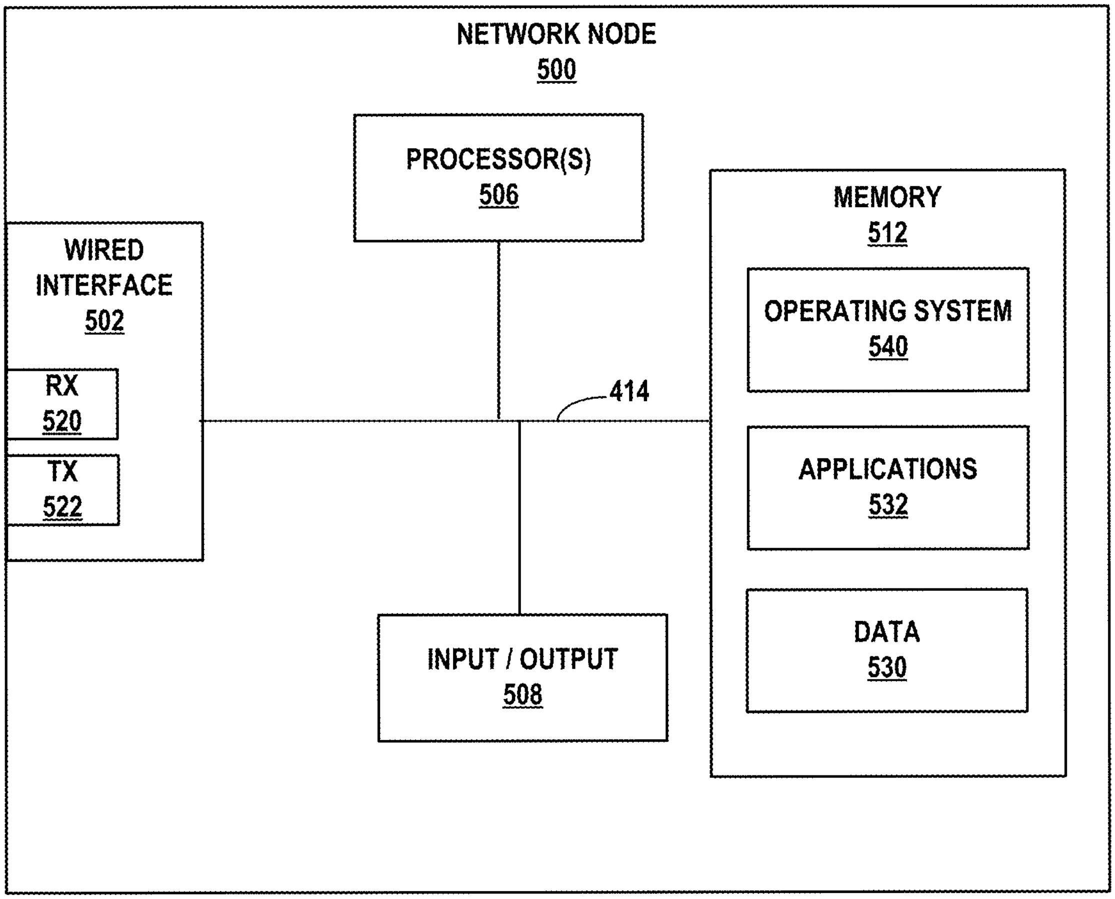
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1A, e.g., router, switch, AAA server 110, DHCP server 116, DNS server 122, VNA 133, web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 stores executable software applications 532, operating system 540 and data/information 530. Data 530 includes system log and/or error log that stores network data for node 500 and/or other devices, such as wireless access points, based on a logging level according to instructions from the network management system. Network node 500 may, in some examples, forward the network data to a network management system (e.g., NMS 130 of FIG. 1A) for analysis as described herein. In some examples, network node 500 may be configured to perform one or more techniques described herein as being performed by NMS 130/300 or network assurance engine 134/324.

Figure 6A:
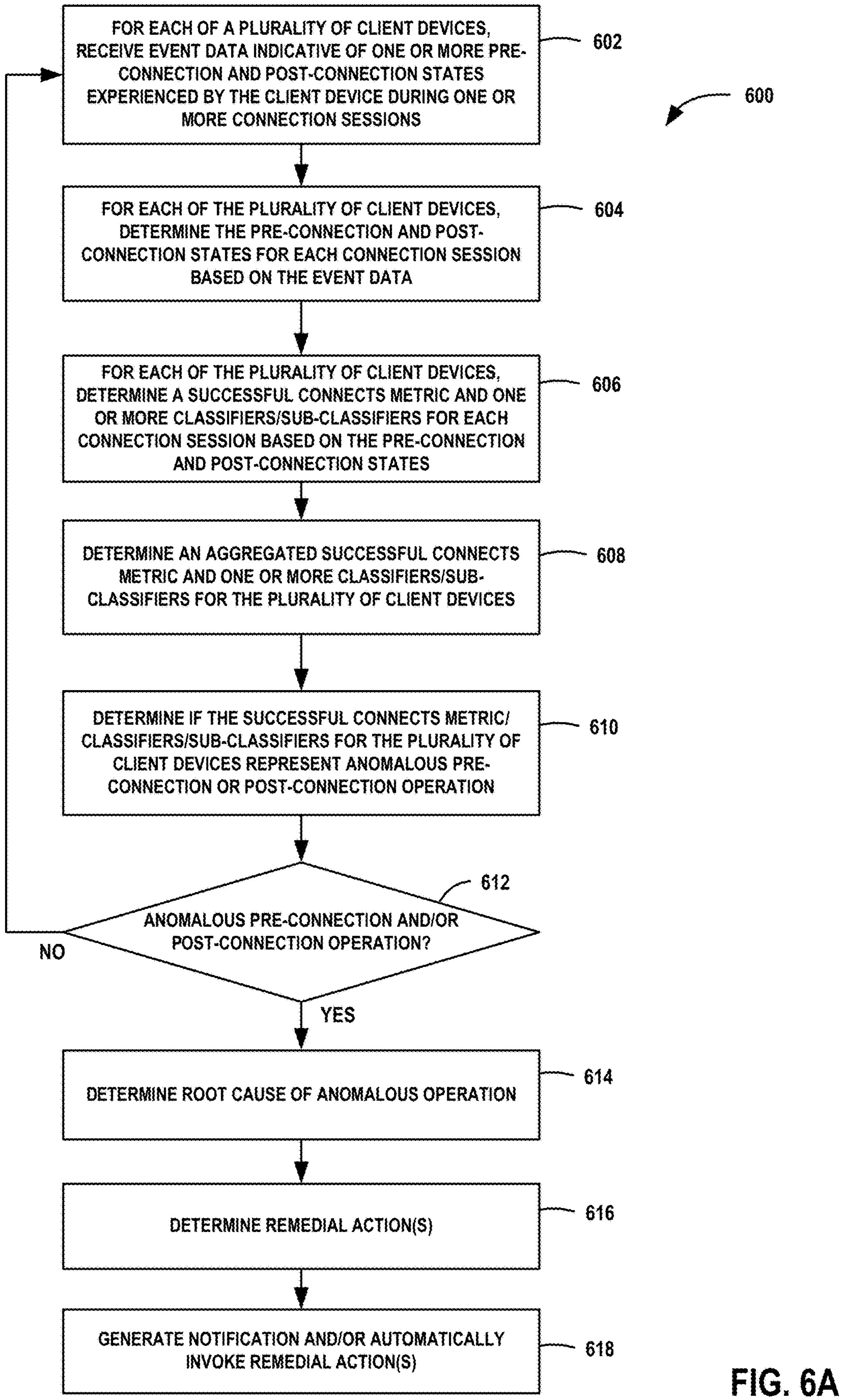
FIG. 6A is a flowchart of an example process by which a network management system determines one or more successful connects metrics associated with a wireless and/or a wired network, in accordance with one or more techniques of the disclosure.

FIG. 6A is a flowchart of an example process (600) by which a network management system, such as NMS 130/300 executing network assurance engine 134/324, respectively, determines a successful connects metric associated with a wireless and/or a wired network, in accordance with one or more techniques of the disclosure. In general, process (600) applies to both wireless client devices and wireless networks, as well as to wired client devices and wired networks, and the disclosure is not limited in this respect. For simplicity of discussion, process (600) of FIG. 6A will be described with respect to wireless client devices and wireless networks, with the understanding that process (600) also applies to wired client devices/wired networks.

For each of a plurality of wireless client devices, the NMS receives event data indicative of one or more pre-connection and/or post connection states experienced by the wireless client device during one or more wireless connection sessions (602). The pre-connection and post-connection states form a stateful machine configured to continuously monitor the wireless connection for the duration of a wireless connection session.

For each of the plurality of wireless client devices, the NMS determines the pre-connection and post-connection states of the stateful machine for each wireless connection session based on the event data for the connection session (604). For example, the start of a connection session may be indicated by an association event (e.g., the association event may be generated by an AP in response to the wireless client sending of an association request). The NMS may initiate a stateful machine for the wireless client in response to the association event. The NMS continuously monitors the pre-connection and/or post-connection states of the connection session for the wireless client device based on a sequence of event data received from the AP device(s) with which the wireless client is associated with (or attempting to associate with) during the connection session. The end of the connection session occurs when any one of the pre-connection or post-connection states is classified as "fail," when the wireless client device sends a disassociation frame to the associated AP (e.g., the event data is indicative of a disassociation event) or vice versa, or when a timeout occurs due to inactivity (e.g., the event data is indicative of a inactivity timeout event, such as when the wireless client leaves the site or otherwise goes out of range of the wireless network).

For each of the plurality of wireless client devices, the NMS determines a successful connects metric and one or more classifiers/sub-classifiers for each connection session based on the pre-connection and/or post-connection states determined for the connection session (606). For example, for each wireless client device, the score for the wireless successful connects metric may be determined as a percentage (or an absolute number) of successful connection sessions for the wireless client device state as compared to the total number of connection sessions that experienced a failure during a selected period of time. As another example, the score for the classifiers/sub-classifiers may be determined as a percentage or an absolute number of connection sessions that experienced a failure with respect to the associated pre-connection or post-connection state during a selected period of time. As one specific example, if a wireless client device had 5 connection sessions over a 24 hour time period, and 3 of the connection sessions had no failed states (e.g., the 3 connection sessions were successful), the score for the wireless successful connects metric for the wireless client device would be 60% (3 out of 5 connection sessions were successful). Continuing with the same example, if 1 of the failed connection sessions experienced a failure during the association state, and 1 of the failed connection sessions experienced a failure during the DHCP state, the score for the association classifier would be 50% and the score for the DHCP classifier would be 50% (1 out of 2 failed connection sessions experienced an association failure and 1 out of 2 failed connection sessions experienced a DHCP failure).

The NMS determines an aggregated wireless successful connects metric and one or more classifiers/sub-classifiers for a plurality of wireless client devices (608). For example, for the plurality of wireless client devices, the score for the aggregated wireless successful connects metric may be determined as a percentage or an absolute number of successful connection sessions for the plurality of wireless client devices during a selected period of time. As another example, the score for the aggregated classifiers/sub-classifiers may be determined as a percentage (or an absolute number) of connection sessions for the plurality of wireless client devices that experienced a failure with respect to the associated pre-connection or post-connection state as compared to the total number of connection sessions that experienced a failure during a selected period of time.

In some examples, the NMS may further determine if the wireless successful connects metric, the classifiers and/or the sub-classifiers for the plurality of wireless client devices represent anomalous operation of any pre-connection and/or post-connection states (610). For example, the NMS may apply a trained machine learning model to classify the pre-connection and or post-connection states for the plurality of wireless client devices performance based on historical data. The trained machine learning model may classify any one or more of the pre-connection or post-connection states as normal or expected operation or as one or more classifications of anomalous (e.g., degraded) operation.

If NMS determines that the wireless successful metrics and/or classifiers/sub-classifiers for the plurality of client devices do not represent anomalous operation (NO branch of 612), the NMS continues to monitor the wireless network event data during one or more connection sessions for a plurality of wireless client devices (602, 604, 606, 608, 610).

In some examples, if the NMS determines that the successful connects metric and/or classifiers/sub-classifiers represent anomalous operation (YES branch of 612), the NMS may further determine one or more root causes of the anomalous operation (614). In some examples, to determine a root cause of the anomalous operation (614), the processor(s) may refer to root cause association data stored in a database, such as database(s) 340 as shown in FIG. 3A. The root cause association data may include, for example, one or more database structures that associate classification (s) of anomalous operation with one or more potential root causes. In other examples, to determine a root cause of the location degradation (614), the NMS may invoke a virtual network assistant (VNA), such as VNA engine 132/350 as shown in FIGS. 1A and 3A, respectively, to invoke a more complex and/or computationally expensive root cause analysis.

The NMS may further determine one or more remedial actions that may be taken to mitigate or address the root cause(s) of the anomalous operation (616). In some examples, to determine the remedial action(s), the NMS may refer to a root cause/remedial action association data stored in database, such as database(s) 340 as shown in FIG. 3A. The root cause/remedial action association data may include, for example, one or more database structures that associate classification(s) of anomalous operation with one or more potential root causes, and further that associate each root cause with one or more remedial actions that may be suggested and/or automatically invoked to mitigate or address the root cause. In other examples, to determine the remedial action(s), the processor(s) may invoke a virtual network assistant (VNA), such as VNA 132/350 to invoke a more complex and/or computationally expensive root cause/remedial action analysis.

In some examples, the NMS may further generate a notification including an indication of the anomalous operation (including, for example, an indication of the state or state(s) during which the pre-connection and/or post-connection failure(s) occurred), an indication of one or more suspected root causes of the anomalous operation (e.g., an indication of the device(s) and/or networks in which the pre-connection and/or post-connection failure(s) occurred), and one or more suggested remedial actions that may be taken by IT personnel to further troubleshoot and/or address the anomalous operation (614). In some examples, the NMS may automatically invoke one or more of the determined remedial actions responsive to the determined root causes of the anomalous operation in an attempt to mitigate or address the anomalous operation (614). The NMS may continuously repeat process (600) for the wireless network and update the successful connects metric for each of a plurality of connection sessions occurring in the wireless network, monitor for anomalous pre-connection and/or post-connection state operation, determine root cause(s) of anomalous operation and automatically perform remedial actions (including notifications and/or automatically invoking one or more remedial actions) to address the anomalous behavior on a continuous basis.

Figure 6B:
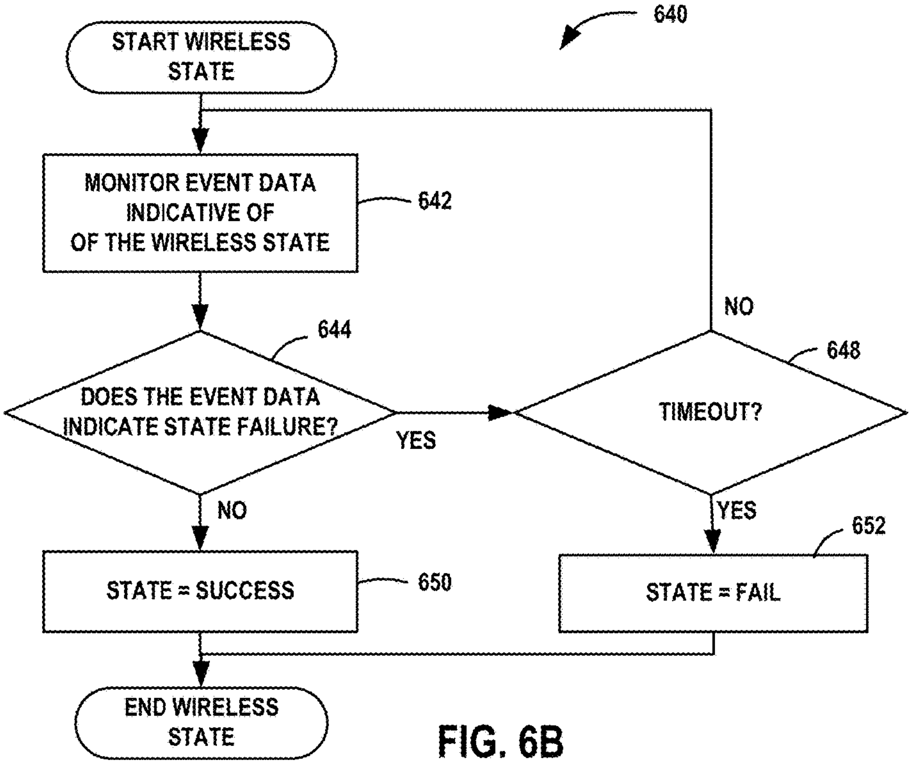
FIG. 6B is a flowchart of an example process by which a network management system determines a pre-connection or post-connection state of a wireless connection session of a wireless client device based on event data associated with the wireless client device, in accordance with one or more techniques of the disclosure.

FIG. 6B is a flowchart of an example process (640) by which a network management system, such as NMS 130/300 executing network assurance engine 134/324, determines a pre-connection or post-connection state of a wireless connection session for a wireless client device based on event data indicative of the pre-connection or post-connection state of the wireless client device, in accordance with one or more techniques of the disclosure. Process (640) may apply to any one or more of the pre-connection and/or post-connection wireless states, and as such any reference to the term "state" with respect to process 640 may include any one of a pre-connection state or a post-connection wireless state. Process (640) essentially filters out false positive noise in the wireless event data received for a wireless client device that does not truly affect the experience of the wireless client device from the perspective of the user.

The NMS receives event data indicative of the start of a wireless state of a wireless client device, and monitors the event data indicative of the wireless state of the wireless client device (642). If the event data is not indicative of a state failure (NO branch of 644), the state is set to "success" (650) and the wireless state ends. If the event data is indicative of a state failure (YES branch of 644), NMS determines whether a state-specific timeout period has elapsed (648). If the state-specific timeout period has not elapsed (NO branch of 648), NMS continues to monitor the event data indicative of the wireless state in the order it is received (642). If the state-specific timeout period has elapsed (YES branch of 648), the state is set to "fail" (652) and this marks the end of the wireless state.

The state-specific timeout period has the effect of filtering out false positive noise in the wireless event data that might otherwise cause the state of the connection session to be prematurely set to "fail." By continuing to monitor the event data during the timeout period, the NMS ignores any event data indicative of a state failure until the expiration of the timeout period. In some examples, the timeout period for a wireless state may be on the order of a few seconds for the association state, the ARP state, the DNS state, and the DHCP state, and a minute or so for the pre-connection authorization state (sufficient to allow for a few erroneous network password entries).

As one example of the process (640), assume the wireless state is the DHCP state, and the event data indicates that the wireless device received a DHCP ACK message and is successfully bound to the wireless network. In such an example, the event data is not indicative of a state failure (NO branch of 644), the DHCP state is set to "success" (650) and this marks the end of the DHCP state. NMS may start additional DHCP states at one or more times during the wireless connection session (during DHCP renew, for example), and process (640) is repeated for each time the DHCP state is initiated. The state may thus change from "success" to "fail" during a connection session, for example, if DHCP discovery resulted in the DHCP state to be set to "success" and a DHCP renewal later resulted in the DHCP state to be set to "fail." In that example, the DHCP sub-classifier "Renew unresponsive" would be set to "fail," thus attributing the DHCP failure to a DHCP renewal unresponsive failure.

Figure 6C:
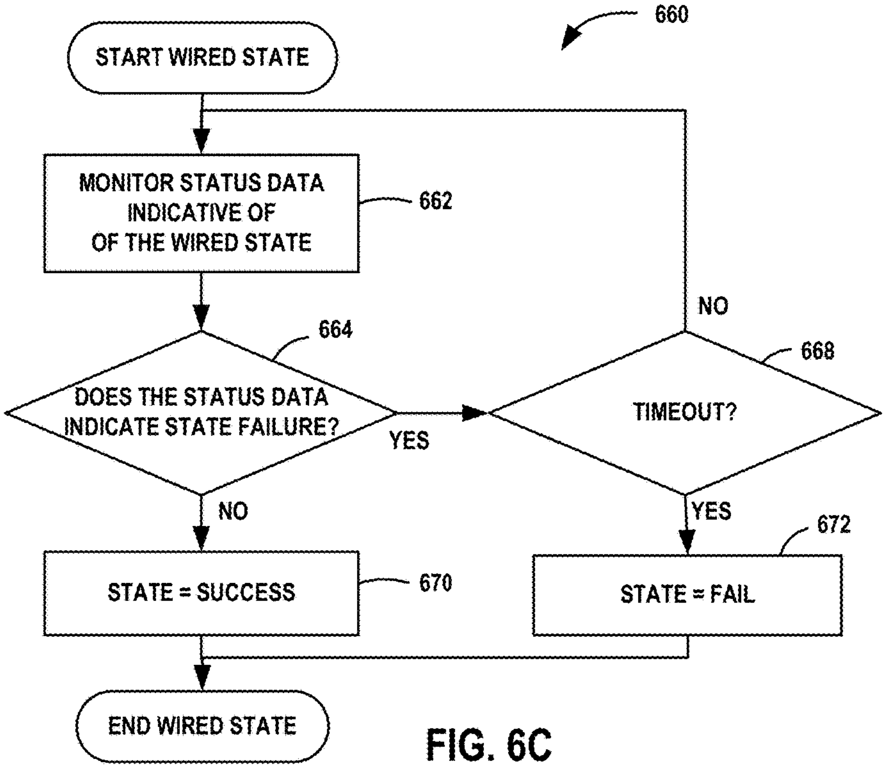
FIG. 6C is a flowchart of an example process by which a network management system determines a pre-connection or a post-connection state of a wired connection session for a wired client device based on wired client device status data, in accordance with one or more techniques of the disclosure.

FIG. 6C is a flowchart of an example process (660) by which a network management system, such as NMS 130/

300 executing network assurance engine 134/324, determines a pre-connection or a post-connection state of a wired connection session for a wired client device based on wired client device status data, in accordance with one or more techniques of the disclosure.

Process (660) may apply to any one or more of the pre-connection and/or post-connection wired states, and as such any reference to the term "state" with respect to process 660 may include any one of a pre-connection state or a post-connection wired state. Process (660) essentially filters out false positive noise in the wired device status data received on a periodic basis for a wired client device that does not truly affect the experience of the wired client device from the perspective of the user.

The NMS receives wired device status data indicative of the start of a wired state of the wired client device, and monitors the wired device status data indicative of the wired state of the wired client device (662). If the wired device status data is not indicative of a state failure (NO branch of 664), the state is set to "success" (670) and the wired state ends. If the wired device status data is indicative of a state failure (YES branch of 664), NMS determines whether a state-specific timeout period has elapsed (668). If the state-specific timeout period has not elapsed (NO branch of 668), NMS continues to monitor the wired device status data indicative of the wired state in the order it is received (662). If the state-specific timeout period has elapsed (YES branch of 668), the state is set to "fail" (652) and this marks the end of the wired state.

The state-specific timeout period has the effect of filtering out false positive noise in the wired device status data that might otherwise cause the state of the wired connection session to be prematurely set to "fail." By continuing to monitor the event data during the timeout period, the NMS ignores any wired device status data indicative of a state failure until the expiration of the timeout period. In some examples, the timeout period for a wired state may be on the order of 3-10 minutes to allow for several periodic status messages (e.g., device heartbeat messages sent every 1 minute) to be received by the NMS from the wired device.

Figure 7A:
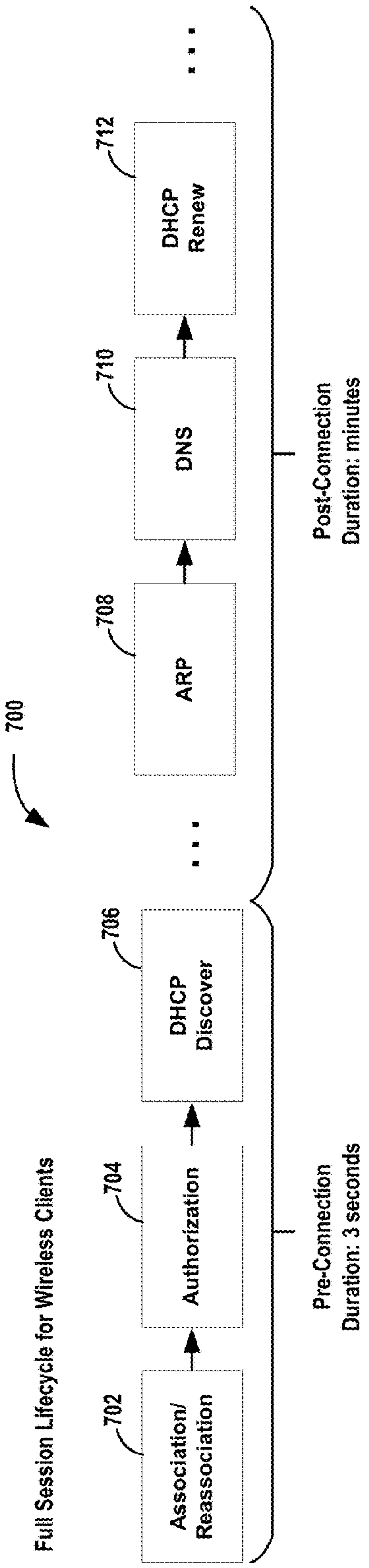
FIG. 7A shows example pre-connection and post-connection states for wireless networks in accordance with one or more techniques of the disclosure.

FIG. 7A shows an example state diagram of a stateful machine 700 for a full wireless connection session for a wireless client device, including one or more pre-connection and post-connection states that are monitored to determine a wireless successful connects metric, in accordance with one or more techniques of the disclosure. The wireless pre-connection and post-connection states may include, for example, an association/reassociation state 702, an authorization state 704, a DHCP discover state 706, an ARP state 708, a DNS state 710, and a DHCP renew state 712. In general, the association state and the authorization states are pre-connection states. The DHCP discovery state is a pre-connection state and the DHCP renew state is a post-connection state. The ARP state and the DNS state are post-connection states.

Each of the wireless pre-connection and post-connection states corresponds to one of the wireless successful connect metric classifiers. For example, association/reassociation state 702 corresponds to the association classifier, authorization state 704 corresponds to the authorization classifier, DHCP discover state 706 and DHCP renew state 712 correspond to the DHCP classifier, ARP state 708 corresponds to the ARP classifier, and DNS state 710 corresponds to the DNS classifier.

Figure 7B:
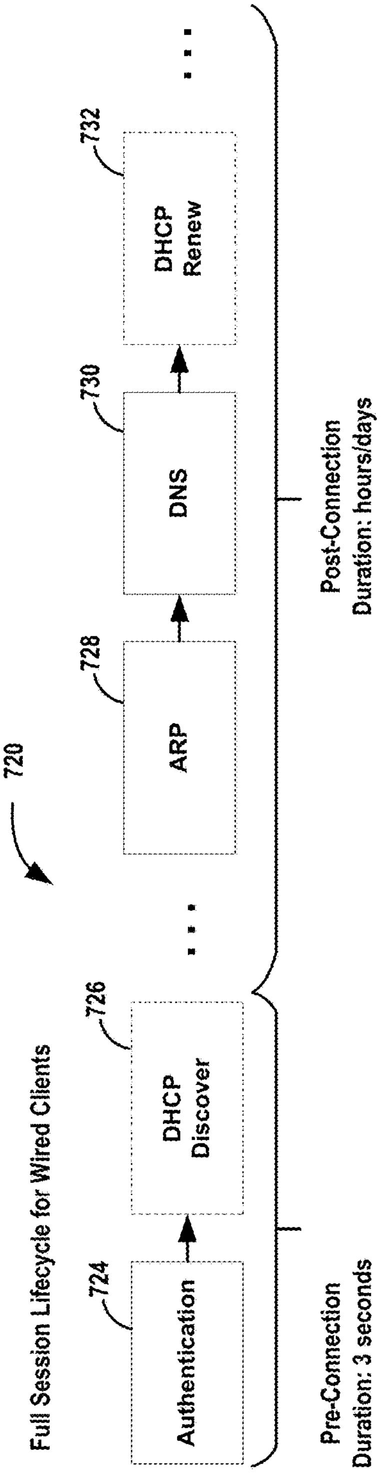
FIG. 7B shows example pre-connection and post-connection states for wired networks in accordance with one or more techniques of the disclosure.

FIG. 7B shows an example state diagram of a stateful machine 720 for a full wired connection session for a wired client device, including one or more pre-connection and post-connection states that are monitored to determine a wired successful connects metric, in accordance with one or more techniques of the disclosure. The wired pre-connection and post-connection states may include, for example, an authentication state 724, a DHCP discover state 726, an ARP state 728, a DNS state 730, and a DHCP renew state 732. In examples where an IP address is manually or statically assigned to the wired client device, stateful machine 720 will not include DHCP discovery state 726 or DCHP renew state 732.

Each of the wired pre-connection and post-connection states corresponds to one of the wired successful connect metric classifiers. For example, authentication state 724 corresponds to the wired authentication classifier, ARP state 728 corresponds to the ARP classifier, DNS state 730 corresponds to the DNS classifiers, and DHCP discover state 726 and DHCP renew state 732 correspond to the wired DHCP classifier.

FIGS. 8A-8E show example user interfaces that may be displayed with respect to one or more wireless and/or wired successful connects metrics, in accordance with one or more techniques of the disclosure.

Figure 8A:
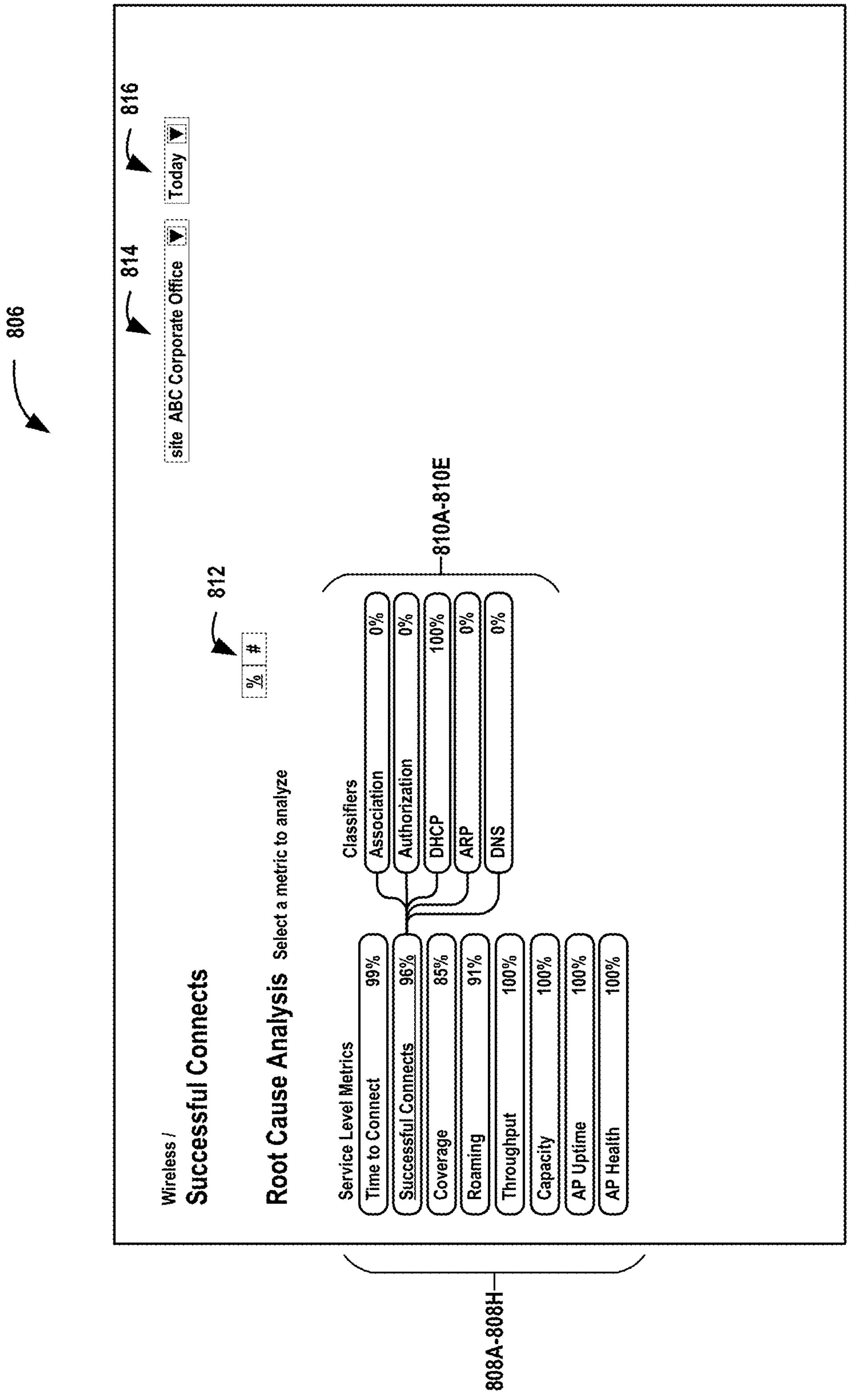
FIGS. 8A-8E illustrate example user interfaces that may be displayed with respect to wireless and/or wired successful connects metrics, in accordance with one or more techniques of the disclosure.

FIG. 8A shows an example user interface 806 including user interface elements 808A-808H and 810A-810E corresponding to wireless service level metrics that may be generated by NMS 130/300 as described herein with respect to FIG. 3B. In accordance with one or more techniques of the disclosure, the wireless service level metrics include a wireless successful connects metric (corresponding to user interface element 808B) indicative of pre-connection and post-connection states of a plurality of wireless connection sessions for a plurality of wireless client devices associated with a wireless network. By interacting with one or of the user interface elements shown in FIGS. 8A-8E, for example, a user may view data relating to the wireless successful connects metric. In this example, user interface element 808B is selected, causing user interface 806 to display user interface elements 810A-810E corresponding to the wireless successful connects metric classifiers. These classifiers include association (user interface element 810A), authorization (810B), DHCP (810C), ARP (810D) and DNS (810E). Selection of any of user interface elements 810A-810E by a user causes user interface 806 to display further details concerning the corresponding wireless successful connects classifier.

In this example, each user interface element 808A-808H includes a score assigned to the corresponding wireless service level metric. The score for the wireless successful connects metric is an aggregation of the scores of a plurality of connection sessions for a plurality of wireless client devices during the selected period of time. In this example, the score for the successful connects metric is 96%. In some examples, the score for the wireless successful connects metric may be viewed as a percentage or an absolute number of successful connection sessions for a plurality of wireless clients during a selected period of time. In this example, the user has selected to view the service level metrics for the wireless network located at site "ABC Corporate Office" using pull-down menu 814, has selected the period of time for review to "Today" using pull-down menu 816, and has selected to view the wireless successful connects metric/classifier/sub-classifier scores in terms of a percentage using user interface element 812.

Each user interface element 810A-810E includes a score assigned to the corresponding wireless successful connects metric classifier. The score for the wireless successful connects metric classifiers/sub-classifiers is an aggregation of the scores of a plurality of connection sessions for a plurality of wireless client devices during the selected period of time. In some examples, each successful connect metric classifier/sub-classifier score may be viewed as a percentage or an absolute number of connection sessions for a plurality of wireless clients that experienced a failure with respect to the associated state as compared to the total number of connection sessions that experienced a failure during the selected period of time. In this example, the score for each of the association, authorization, ARP and DNS classifiers is 0%, indicating that 0% (none) of the connection sessions experiencing a failure during the selected period of time experienced an association, authorization, ARP or DNS failure, respectively. The score for the DHCP classifier is 100%, indicating that 100% (all) of the connection sessions that experienced a failure during the selected period of time experienced a DHCP failure.

Figure 8B:
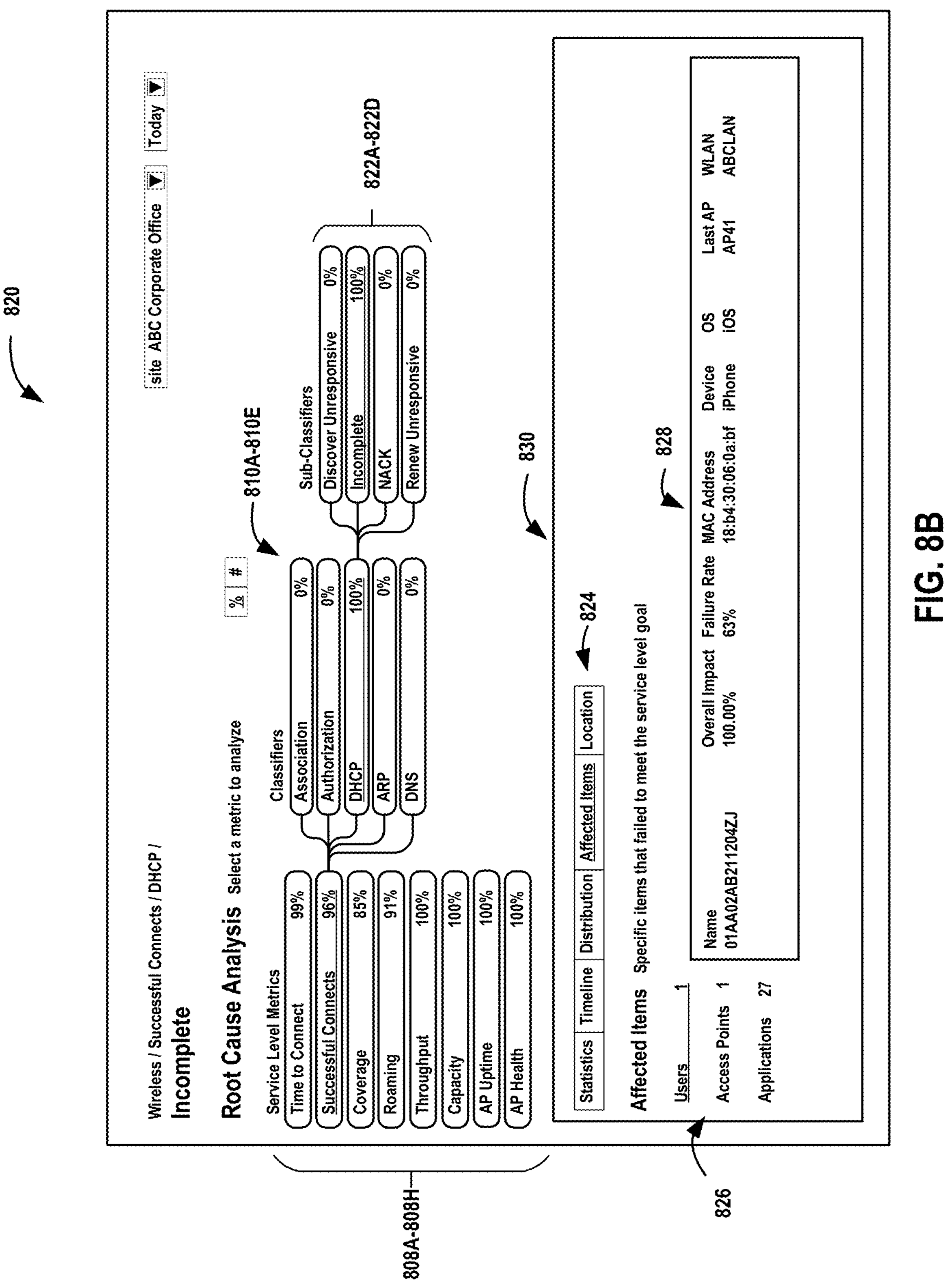

The user may further select any one of user interface elements 810A-810E to view further insights into the associated pre-connection or post-connection state. In the example of FIG. 8B, user interface element 810C corresponding to the DHCP classifier is selected, causing user interface 820 to display user interface elements 822A-822D, each corresponding to one of the wireless DHCP sub-classifiers. The score for each sub-classifier is shown as a percentage of connection sessions for a plurality of wireless client devices that experienced a failure with respect to the associated pre-connection or post-connection state as compared to the total number of connection sessions that experienced the associated pre-connection or post-connection state failure during the selected period of time. In this example, the score for the DHCP incomplete sub-classifier is 100%, indicating that 100% (all) of the connection sessions experiencing a failure during the selected period of time experienced a DHCP incomplete failure.

In the example of FIG. 8B, further data related to the selected DHCP incomplete sub-classifier is displayed in sub-window 830. User interface 820 includes example user selectable tabs 824, including "Statistics," "Timeline," "Distribution," "Affected Items," and "Location," by which a user may view data related to the selected classifier/sub-classifier. For example, under the "Statistics" tab, sub-window 830 may display one or more statistics relevant to the selected classifier/sub-classifier, such as a success rate (as a percentage and/or an absolute number of connection sessions corresponding to the selected classifier/sub-classifier, for example), a percentage (and/or absolute number) of users below a service level goal corresponding to the selected classifier/sub-classifier, etc. As another example, under the "Timeline" tab, sub-window 830 may display a graph of connection session failures relevant to the selected classifier/sub-classifier versus time. The timeline may further include a total number of user minutes during which users experienced one or more failures to provide insight into the impact of the failures on users.

In the example of FIG. 8B, in sub-window 830, the "Affected Items" tab has been selected, causing user interface 820 to display information regarding those wireless client devices that experienced a failure associated with the DHCP incomplete sub-classifier. In addition, sub-window 830 includes user interface elements 826 by which a user may further refine the data by Affected Item type; in this example, the user may choose to display data associated with "Users," "Access Points," or "Applications." In this example, "Users" has been selected, causing user interface 820 to display a list of wireless devices that experienced a failure corresponding to the DHCP incomplete state during a wireless connection session in sub-window 828. In this example, a single wireless client device is listed as well as one or more statistics including an overall impact on the DHCP incomplete sub-classifier score (in this case, 100% as only a single device is listed), the failure rate associated with the device, the MAC Address of the device, the Device type, operating system, the last AP with which the wireless client device was associated, and the name of the wireless LAN.

Figure 8C:
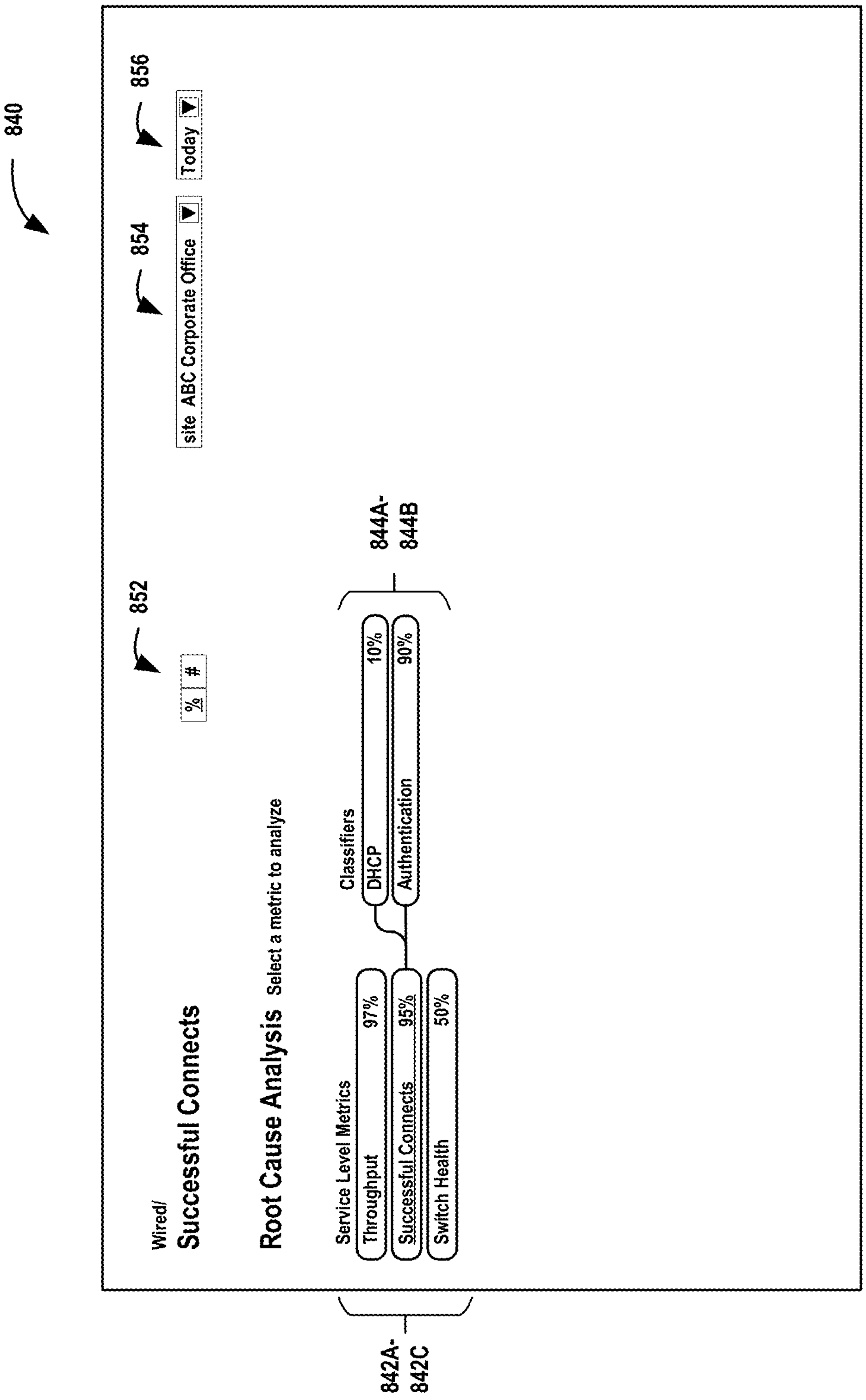

FIG. 8C shows an example user interface 840 including user interface elements 842A-842C and 844A-844B corresponding to wired service level metrics that may be generated by NMS 130/300 as described herein with respect to FIG. 3B, in accordance with one or more techniques of the disclosure. In accordance with one or more techniques of the disclosure, the wired service level metrics include a wireless successful connects metric (corresponding to user interface element 842B) indicative of pre-connection and post-connection states of a plurality of wired connection sessions for a plurality of wired client devices associated with a wired network.

In this example, user interface element 842B is selected, causing user interface 840 to display user interface elements 844A-844B corresponding to the wired successful connects metric classifiers. In this example, these classifiers include DHCP (844A) and authentication (844B). In some examples, the user interface elements 844 may further include user interface elements corresponding to an ARP classifier and a DNS classifier. Selection of any of user interface elements 844A-844B cause user interface 840 to display further details related to the corresponding wired successful connects classifier as described above with respect to FIG. 8B.

Each user interface element 842A-842C includes a score assigned to the corresponding wired service level metric. In this example, the score for the wired successful connects service level metric is 96%. In some examples, the score for the wired successful connects metric may be viewed as a percentage or an absolute number of successful wired connection sessions for a plurality of wired clients that successfully connected to the wired network during a selected period of time. In this example, the user has selected to view the service level metrics for the wired network located at site "ABC Corporate Office" using pull-down menu 854, has selected the period of time for review to "Today" using pull-down menu 856, and has selected to view the wired successful connect metric in terms of a percentage using user interface element 852.

Each user interface element 844A-844B includes a score assigned to the corresponding wired successful connects metric classifier. In this example, the score for the wired successful connects metric classifiers/sub-classifiers may be viewed as a percentage or an absolute number of wired connection sessions for a plurality of wired clients that experienced a failure with respect to the associated state as compared to the total number of connection sessions that experienced a failure during a selected period of time. In this example, the score for the authentication classifier is 90%, indicating that 90% of the wired connection sessions experiencing a failure during the selected period of time experienced an authentication failure. The score for the DHCP classifier is 10%, indicating that 10% of the wired connection sessions experiencing a failure during the selected period of time experienced a DHCP failure. The user may further select any one of user interface elements 844A-844B to view further insights into wired network behavior with respect to the wired successful connects metric similarly to that described above with respect to FIGS. 8A and 8B.

NMS 130/300 may also generate for display similar user interfaces including data associated with the other wireless/wired successful connects metric classifiers/sub-classifiers. The information generated and displayed with respect to the wireless/wired successful connect metric and the associated classifiers and sub-classifiers provides insights into wireless/wired network operation, and particularly into pre-connection and post-connection states for the duration of a wireless/wired connection session. These insights may assist IT personnel in troubleshooting failures that may arise during a full wireless/wired connection session, including pre-connection and post-connection states. In addition, in some examples, a network management system, such as NMS 130/300, may use the information generated during determination of the wireless/wired successful connect metric to automatically identify a root cause of any anomalies detected during one or more pre-connection and/or post-connection states and/or to automatically invoke corrective action to address the identified anomalies, thus improving the user experience provided to wireless/wired clients by the wireless/wired network.

Figure 8D:
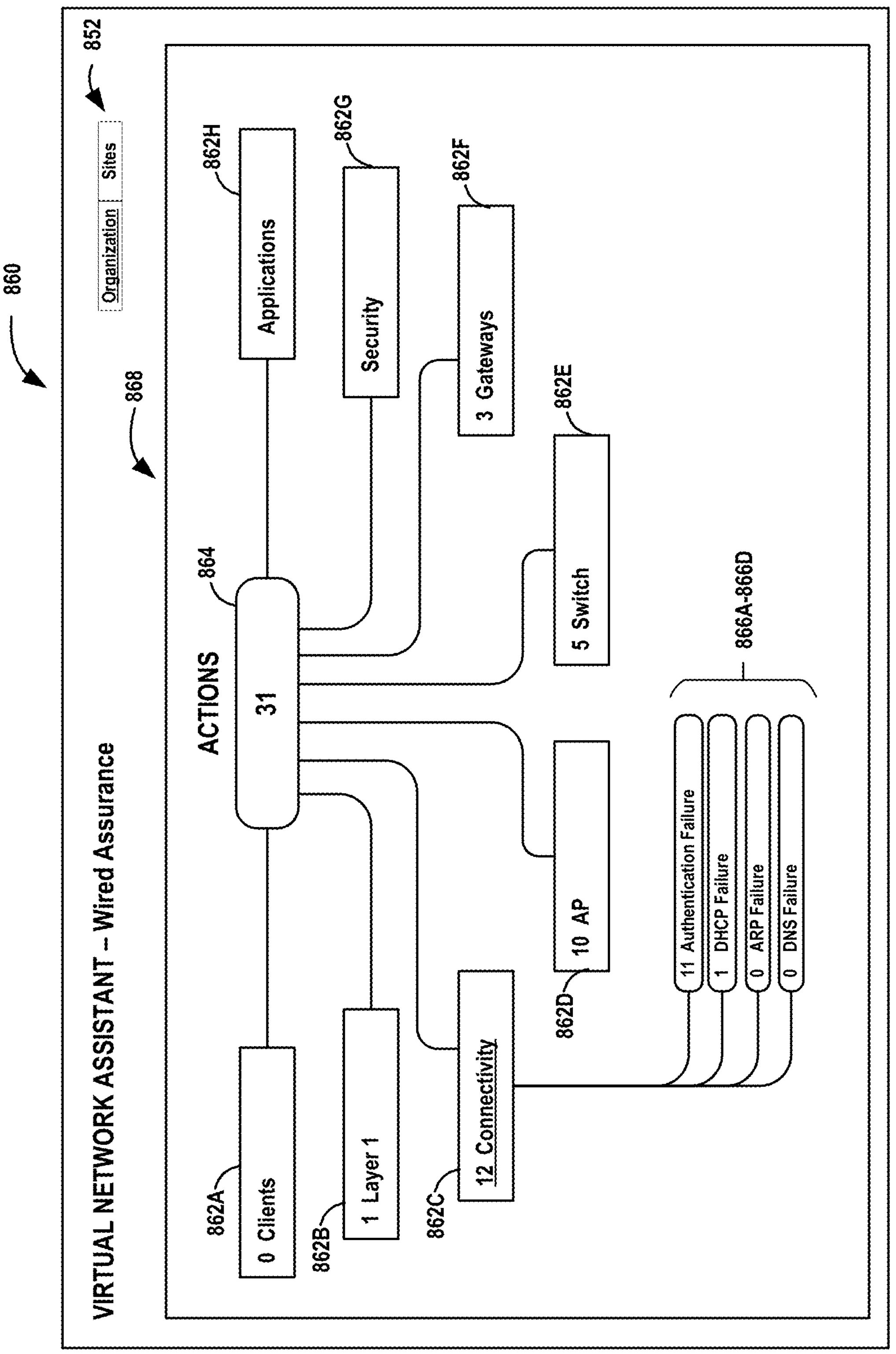
Figure 8E:
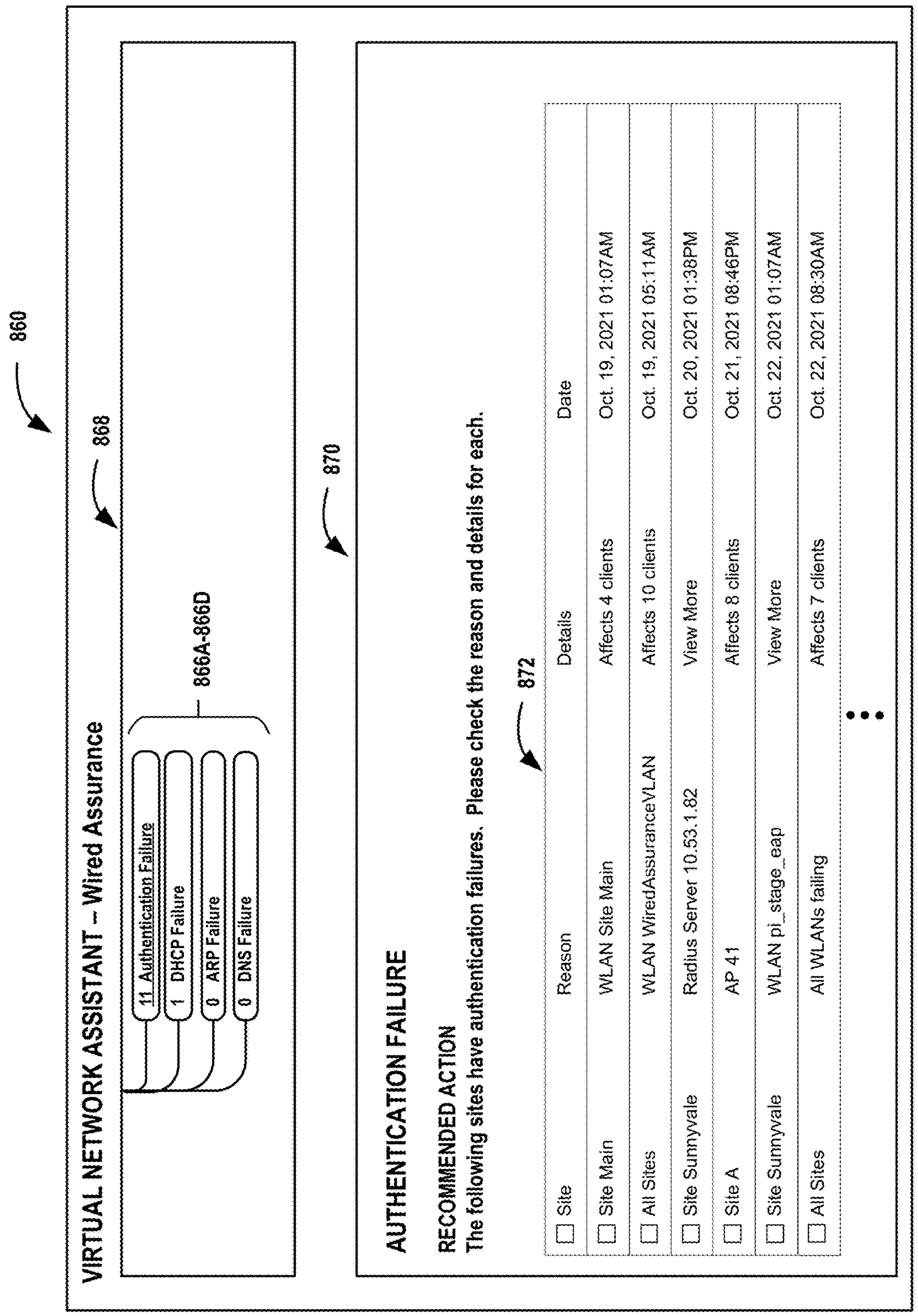

FIGS. 8D and 8E show an example user interface 860 that may be generated by a virtual network assistant (VNA) of a network management system, such as VNA 350 of NMS 300, in accordance with one or more techniques of the disclosure. User interface 860 includes one or more user interface elements indicative of actions taken or indicated by a virtual network assistant. In this example, the user interface 860 is shown and described with respect to a wired network; however, it shall be understood that similar user interfaces may be generated and displayed with respect to wireless networks, and the disclosure is not limited in this respect.

As described herein, the VNA may determine if the successful connects metric/classifiers/sub-classifiers represent anomalous pre-connection or post-connection operation. If the successful connects metric/classifiers/sub-classifiers represent anomalous operation of one or more pre-connection or post-connection states, the VNA may determine a root cause of the anomalous operation, determine one or more remedial actions to address or mitigate the root cause of the anomalous operation, and/or generate a notification and/or automatically invoke the remedial actions.

User interface 860 includes a window 868 including a plurality of user interface elements 864, 862A-862H and 866A-866D. User interface element 864 lists a total number of "Actions" taken by VNA with respect to the wired network over a selected period of time. Each "Action" corresponds to an identified anomalous operation in the wired network with respect to any of the network attributes associated with user interface elements 862A-862H. In the example of FIG. 8D, 12 actions have been identified with respect to "Connectivity" as shown in user interface element 862C. By selecting user interface element 826C corresponding to "Connectivity," user interface 860 displays user interface elements 866A-866D corresponding to the wired successful connects classifiers Authentication, DHCP, ARP and DNS, along with the corresponding number of "Actions" identified by the VNA for each classifier over the selected period of time. In this example, 11 Authentication failures have been identified, 1 DHCP failure has been identified, and 0 ARP and 0 DNS failures have been identified.

FIG. 8E shows further information displayed in sub-window 870 of user interface 860 upon selection of user interface element 866A corresponding to "Authentication." Sub-window 870 displays a list 872 of the identified Authentication failures that occurred over the selected period of time (six of the eleven Authentication failures are shown in FIG. 8E for simplicity of illustration). The list includes, in this example, the name of the site at which the failure occurred, the suggested reason or root cause of the failure (in this example, an identification of the device or group of devices that is suspected to have caused the failure), details concerning the failure (in this example, the number of wired clients affected), and a date/time stamp.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (wireless clients), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

The specific order or hierarchy of steps in the processes disclosed is an example of example approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (wireless clients), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11 ad ("IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

Definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. The functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. In general, the systems, methods and techniques disclosed herein will work equally well for other types of communications environments, networks and/or protocols.

For purposes of explanation, numerous details are set forth to provide a thorough understanding of the present techniques. However, the present disclosure may be practiced in a variety of ways beyond the specific details set forth herein. Furthermore, while the examples illustrated herein show various components of the system collocated, the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, the components of the system can be combined into one or more devices, or split between devices, such as a transceiver, an access point, a station, a Domain Master, a network operation or management device, a node or collocated on a particular node of a distributed network, such as a communications network. For reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing the ability to diagnose and remedy network issues. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A network management system (NMS) comprising:

a memory; and one or more processors coupled to the memory and configured to:

based on an initial network connection session event determined from network data associated with a given client device of a plurality of client devices connected to one or more access point (AP) devices to access a network provided by the AP devices at a site, initiate a stateful machine for the given client device configured to continuously monitor states of a connection session for the given client device based on event data determined from the network data associated with the given client device, wherein the states of the connection session include at least one pre-connection state indicative of whether the given client device is able to connect to the connection session and at least one post-connection state indicative of whether the given client device is able to remain connected to the connection session;

determine, based on a plurality of stateful machines for the plurality of client devices at the site, one or more network connection assessments for the plurality of client devices at the site, wherein the one or more network connection assessments include information indicative of a success or failure of the given client device to connect to the network for the connection session and information indicative of a success or failure of the given client device to remain connected to the network for the connection session; and based on determining at least one failure from the network connection assessments for the plurality of client devices at the site, output a notification including identification of a root cause of the failure.

2. The NMS of claim 1, wherein the network connection assessment further includes one or more classifiers, and wherein each of the one or more classifiers correspond to a different one of the pre-connection or post-connection wireless states.

3. The NMS of claim 1, wherein the one or more processors are further configured to determine, for each of a plurality of wireless client devices of the plurality of client devices, a wireless successful connects metric based on the at least one pre-connection state and the at least one post-connection state determined for each of a plurality of wireless connection sessions.

4. The NMS of claim 3, wherein the one or more processors are further configured to determine, for the plurality of wireless client devices, an aggregated wireless successful connects metric based on the wireless successful connects metrics determined for each of the plurality of wireless client devices.

5. The NMS of claim 1, wherein the connection session is a wireless connection session, and wherein the states of the wireless connection session include one or more of an association state, an authorization state, a Dynamic Host Configuration Protocol (DHCP) state, an Address Resolution Protocol (ARP) state, or a Domain Name System (DNS) state.

6. The NMS of claim 1, wherein the one or more processors are further configured to determine, for each of a plurality of wired client devices of the plurality of client devices, a wired successful connects metric based on the at least one pre-connection state and the at least one post-connection state determined for each of a plurality of wired connection sessions.

7. The NMS of claim 6, wherein the one or more processors are further configured to determine, for the plurality of wired client devices, an aggregated wired successful connects metric based on the wired successful connects metrics determined for each of the plurality of wired client devices.

8. The NMS of claim 1, wherein the connection session is a wired connection session, and wherein the states of the wired connection session include at least one of a wired authentication state or a wired DNS state.

9. The NMS of claim 1, wherein the plurality of client devices comprises wireless client devices and the network data associated with the wireless client devices comprises the event data, wherein the event data is indicative of each attempt to complete one or more of the states of the connection session and whether each attempt is a success or failure.

10. The NMS of claim 1, wherein the plurality of client devices comprises wired client devices and the network data associated with the wired client devices comprises periodic status updates indicative of a success or failure for one or more of the states of a corresponding wired connection session at an end of a periodic reporting interval.

11. The NMS of claim 1, wherein the one or more processors are configured to:

attribute the at least one failure from the network connection assessments for the plurality of client devices at the site to at least one network connection classifier or sub-classifier;

determine the root cause of the at least one failure based on the attributed at least one network connection classifier or sub-classifier; and automatically invoke at least one remedial action to address or mitigate the root cause of the at least one failure.

12. The NMS of claim 1, wherein the given client device comprises a wireless client device and the states of the connection session for the given wireless client device include a Dynamic Host Configuration Protocol (DHCP) state, and wherein the one or more processors are configured to:

attribute the at least one failure from the network connection assessments for the plurality of client devices at the site to a DHCP classifier, and attribute the at least one failure to one of a DHCP discover unresponsive sub-classifier, an DHCP incomplete sub-classifier, a DHCP NACK sub-classifier, or a DHCP renew unresponsive sub-classifier.

13. A method comprising:

based on an initial network connection session event determined from network data associated with a given client device of a plurality of client devices at a site, initiating a stateful machine for the given client device configured to continuously monitor states of a connection session for the given client device based on event data determined from the network data associated with the given client device, wherein the states of the connection session include at least one pre-connection state indicative of whether the given client device is able to connect to the connection session and at least one post-connection state indicative of whether the given client device is able to remain connected to the connection session, wherein the plurality of client devices includes one of wired client devices at the site with access to a wired network or wireless client devices connected to one or more access point (AP) devices to access a network provided by the AP devices at the site;

determining, based on a plurality of stateful machines for the plurality of client devices at the site, one or more network connection assessments for the plurality of client devices at the site, wherein the one or more network connection assessments include information indicative of a success or failure of the given client device to connect to the network for the connection session and information indicative of a success or failure of the given client device to remain connected to the network for the connection session; and based on determining at least one failure from the network connection assessments for the plurality of client devices at the site, outputting a notification including identification of a root cause of the failure.

14. The method of claim 13, wherein the network connection assessment further includes one or more classifiers, and wherein each of the one or more classifiers correspond to a different one of the pre-connection or post-connection wireless states.

15. The method of claim 13, further comprising determining, for each of a plurality of wireless client devices of the plurality of client devices, a wireless successful connects metric based on the at least one pre-connection state and the at least one post-connection state determined for each of a plurality of wireless connection sessions.

16. The method of claim 15, further comprising determining, for the plurality of wireless client devices, an aggregated wireless successful connects metric based on the wireless successful connects metrics determined for each of the plurality of wireless client devices.

17. The method of claim 13, wherein the connection session is a wireless connection session, and wherein the states of the wireless connection session include one or more of an association state, an authorization state, a Dynamic Host Configuration Protocol (DHCP) state, an Address Resolution Protocol (ARP) state, or a Domain Name System (DNS) state.

18. The method of claim 13, further comprising determining, for each of a plurality of wired client devices of the plurality of client devices, a wired successful connects metric based on the at least one pre-connection state and the at least one post-connection state determined for each of a plurality of wired connection sessions.

19. The method of claim 18, further comprising determining, for the plurality of wired client devices, an aggregated wired successful connects metric based on the wired successful connects metrics determined for each of the plurality of wired client devices.

20. The method of claim 13, wherein the connection session is a wired connection session, and wherein the states of the wired connection session include at least one of a wired authentication state or a wired DNS state.

21. Non-transitory computer-readable storage media comprising instructions that, when executed, configure processing circuitry to:

based on an initial network connection session event determined from network data associated with a given client device of a plurality of client devices at a site, initiate a stateful machine for the given client device configured to continuously monitor states of a connection session for the given client device based on event data determined from the network data associated with the given client device, wherein the states of the connection session include at least one pre-connection state indicative of whether the given client device is able to connect to the connection session and at least one post-connection state indicative of whether the given client device is able to remain connected to the connection session, wherein the plurality of client devices includes one of wired client devices at the site with access to a wired network or wireless client devices connected to one or more access point (AP) devices to access a network provided by the AP devices at the site;

determine based on a plurality of stateful machines for the plurality of client devices at the site, one or more network connection assessments for the plurality of client devices at the site, wherein the one or more network connection assessments include information indicative of a success or failure of the given client device to connect to the network for the connection session and information indicative of a success or failure of the given client device to remain connected to the network for the connection session; and based on determining at least one failure from the network connection assessments for the plurality of client devices at the site, output a notification including identification of a root cause of the failure.

* * * * *